(12) United States Patent
Cooper

(10) Patent No.: US 10,272,958 B2
(45) Date of Patent: Apr. 30, 2019

(54) SPOILER WING EXTENSION AND RETRACTION SYSTEM

(71) Applicant: RennKit LLC, Canton, MI (US)

(72) Inventor: David James Cooper, Canton, MI (US)

( * ) Notice: Subject to any disclaimer, the term of this patent is extended or adjusted under 35 U.S.C. 154(b) by 126 days.

(21) Appl. No.: 15/174,991

(22) Filed: Jun. 6, 2016

(65) Prior Publication Data

US 2016/0355219 A1 Dec. 8, 2016

Related U.S. Application Data

(60) Provisional application No. 62/172,151, filed on Jun. 7, 2015.

(51) Int. Cl.
*B62D 35/00* (2006.01)

(52) U.S. Cl.
CPC ............. *B62D 35/007* (2013.01); *Y02T 10/82* (2013.01)

(58) Field of Classification Search
CPC ....... B62D 37/02; B62D 35/02; B62D 35/007
USPC ....................................... 296/181.5
See application file for complete search history.

(56) References Cited

U.S. PATENT DOCUMENTS

| | | | |
|---|---|---|---|
| 4,087,065 A | 5/1978 | Arnquist et al. | |
| 4,902,067 A | 2/1990 | Sakai et al. | |
| 6,030,028 A | 2/2000 | Radmanic et al. | |
| 6,170,904 B1 * | 1/2001 | Schaedlich | B62D 35/007 180/903 |
| 6,575,522 B2 | 6/2003 | Borghi et al. | |
| 7,213,870 B1 | 5/2007 | Williams | |
| 8,113,571 B2 * | 2/2012 | Goenueldinc | B62D 35/007 296/180.1 |
| 8,418,954 B2 | 4/2013 | Allen | |
| 8,584,778 B2 * | 11/2013 | Wolf | B60K 11/04 180/68.1 |
| 9,102,367 B1 | 8/2015 | Beierl et al. | |
| 2003/0071485 A1 | 4/2003 | Kazama | |
| 2004/0256885 A1 | 12/2004 | Bui | |
| 2007/0236044 A1 * | 10/2007 | Froeschle | B62D 35/007 296/180.5 |
| 2015/0084372 A1 * | 3/2015 | Green | B60T 1/16 296/180.5 |
| 2015/0375809 A1 | 12/2015 | Yuasa et al. | |
| 2017/0297637 A1 * | 10/2017 | Shinedling | B62D 35/02 |

* cited by examiner

*Primary Examiner* — Pinel E Romain
(74) *Attorney, Agent, or Firm* — Olav M. Underdal; IDP Patent Services

(57) ABSTRACT

A spoiler wing extension and retraction system, includes a vehicle mounting assembly, including a circular insert, a spider clamp flange, a clamp bolt and nut, and fasteners, seal and spacer plates; a linear-motion device, including a main body and an extendable shaft; an intermediate attachment assembly; such that the extendable shaft connects to a spoiler wing of a vehicle, such that the linear-motion device lifts and lowers the spoiler wing. A spoiler wing control system includes a spoiler wing extension and retraction system connected to a spoiler wing control unit, including a processor, a non-transitory memory, an input/output component, a linear-motion controller, and a data bus, such that the linear-motion controller is configured to control the linear-motion device of the spoiler wing extension and retraction system.

22 Claims, 18 Drawing Sheets

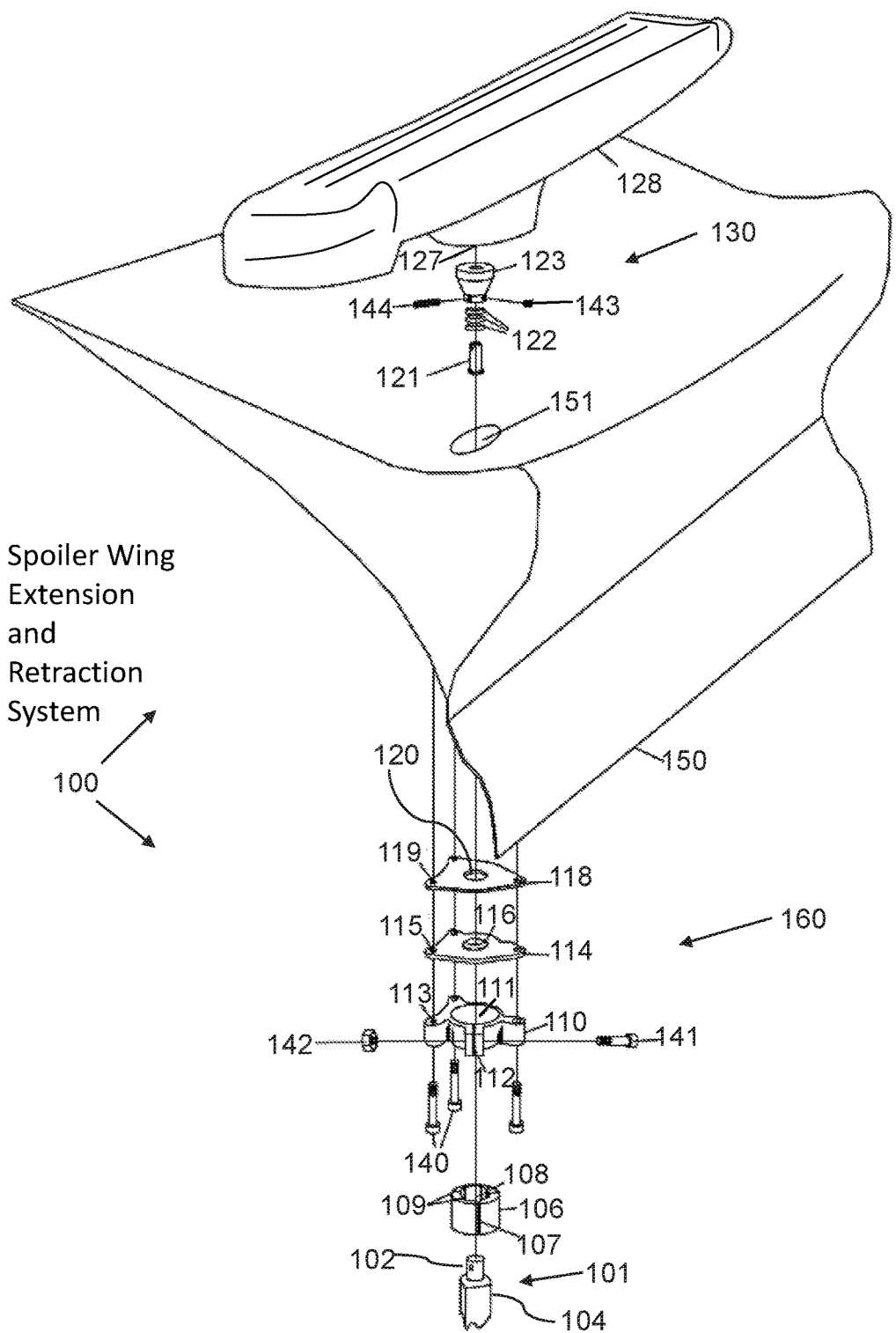

Spoiler Wing Extension and Retraction System

Spoiler Wing Extension and Retraction System

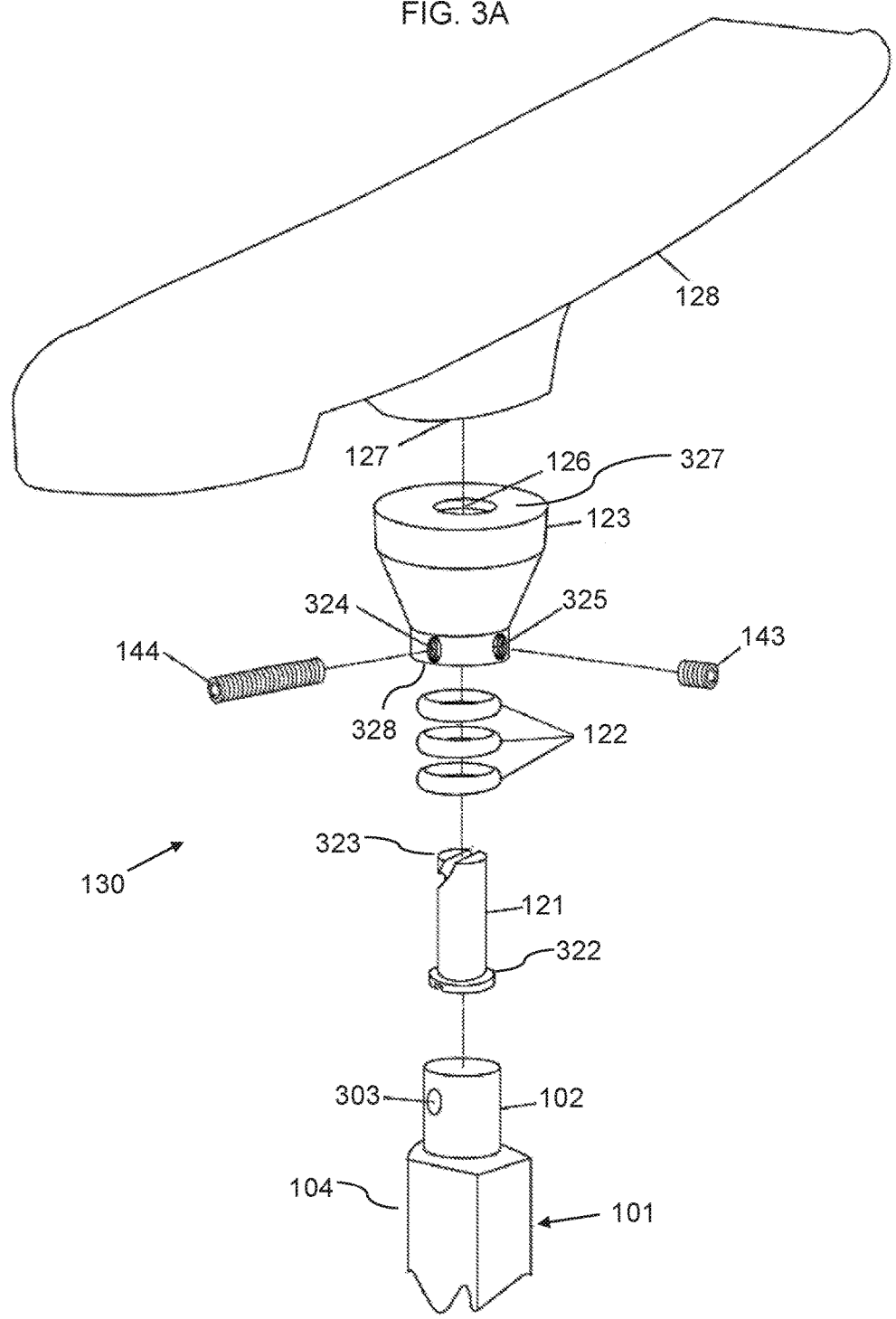

Intermediate Attachment Device

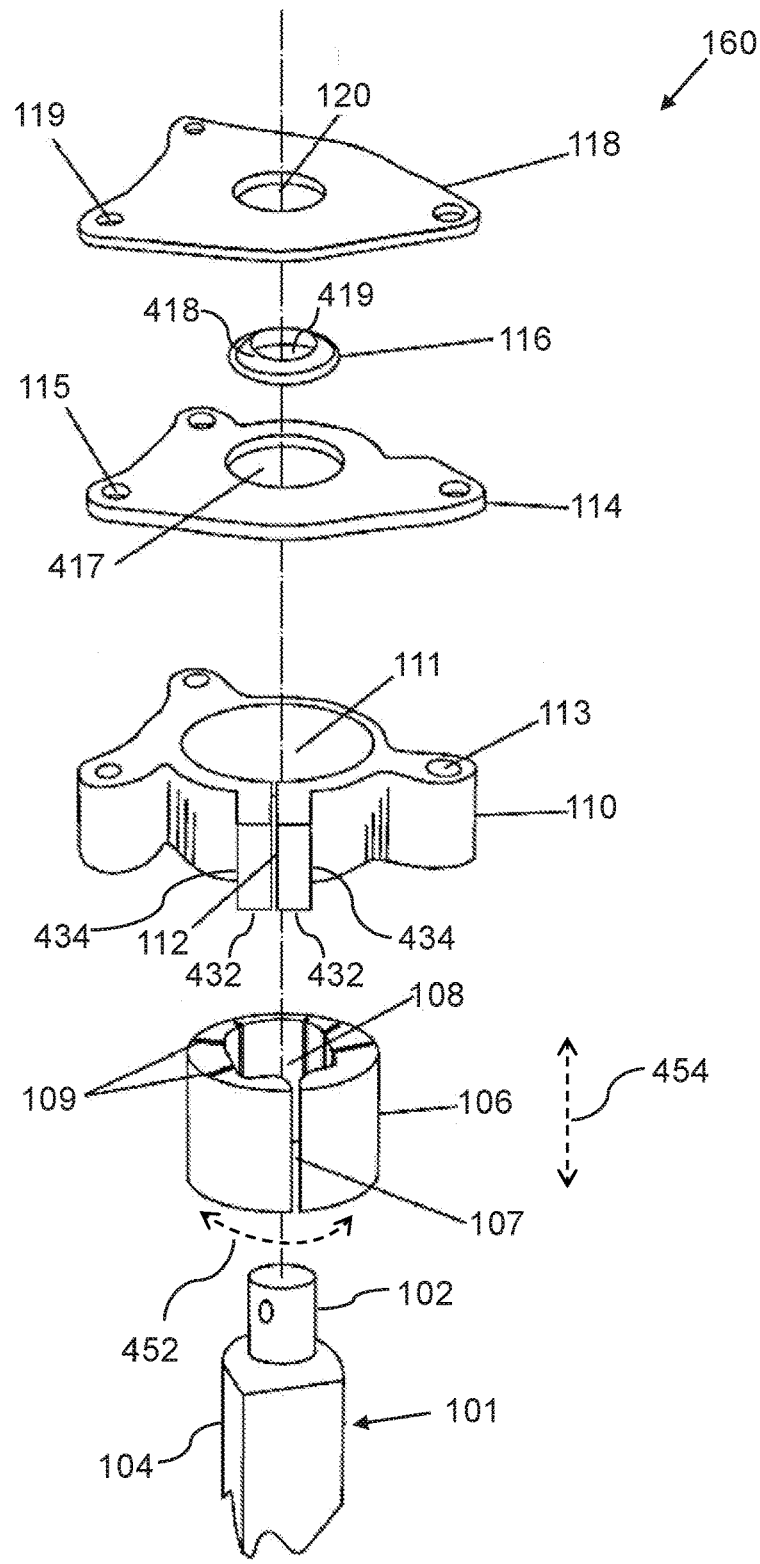

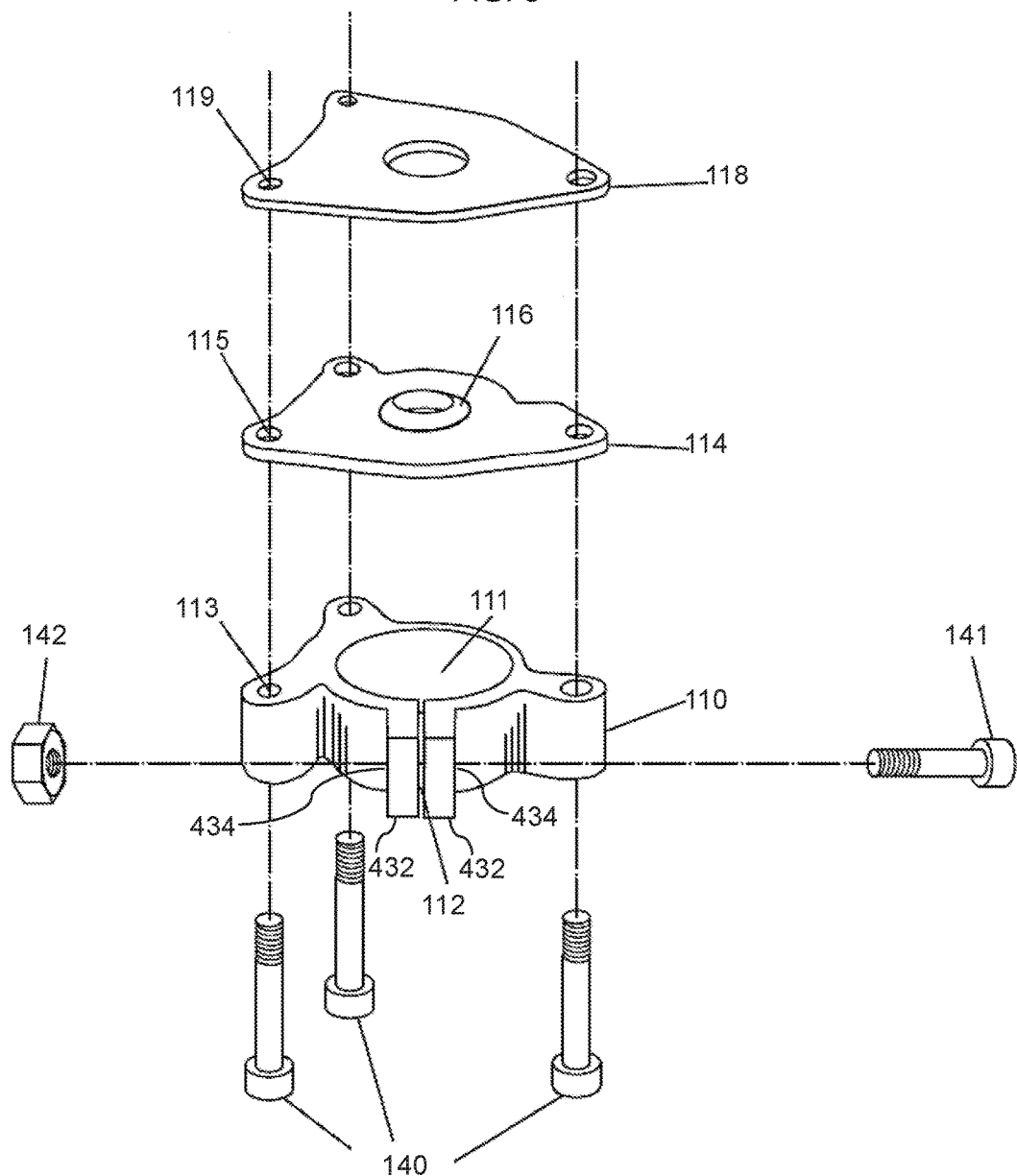

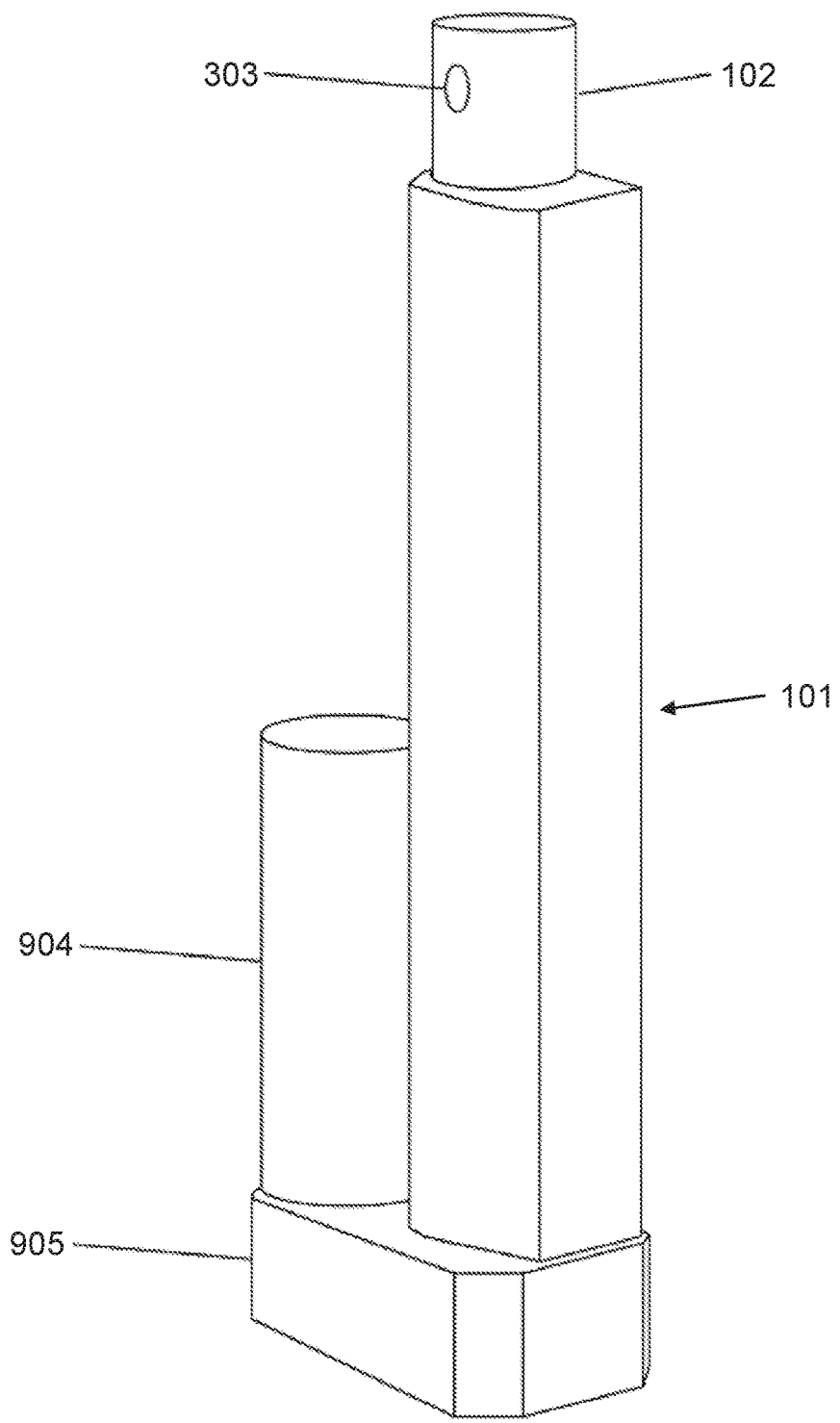

Spoiler Wing Control Unit

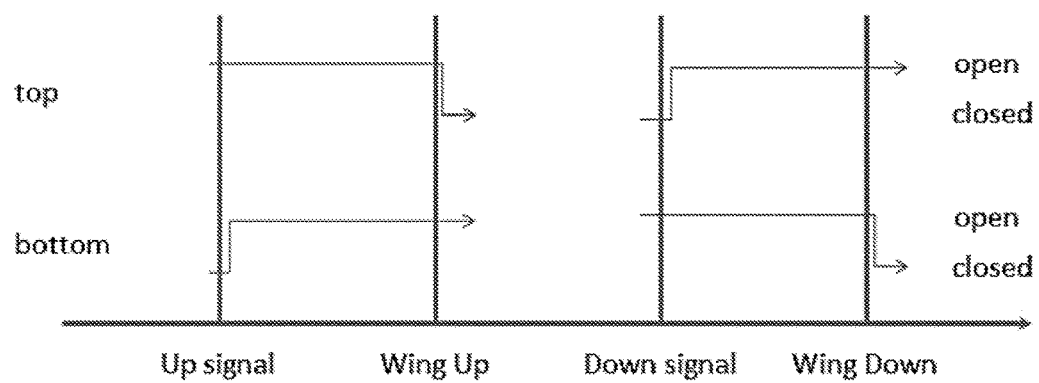

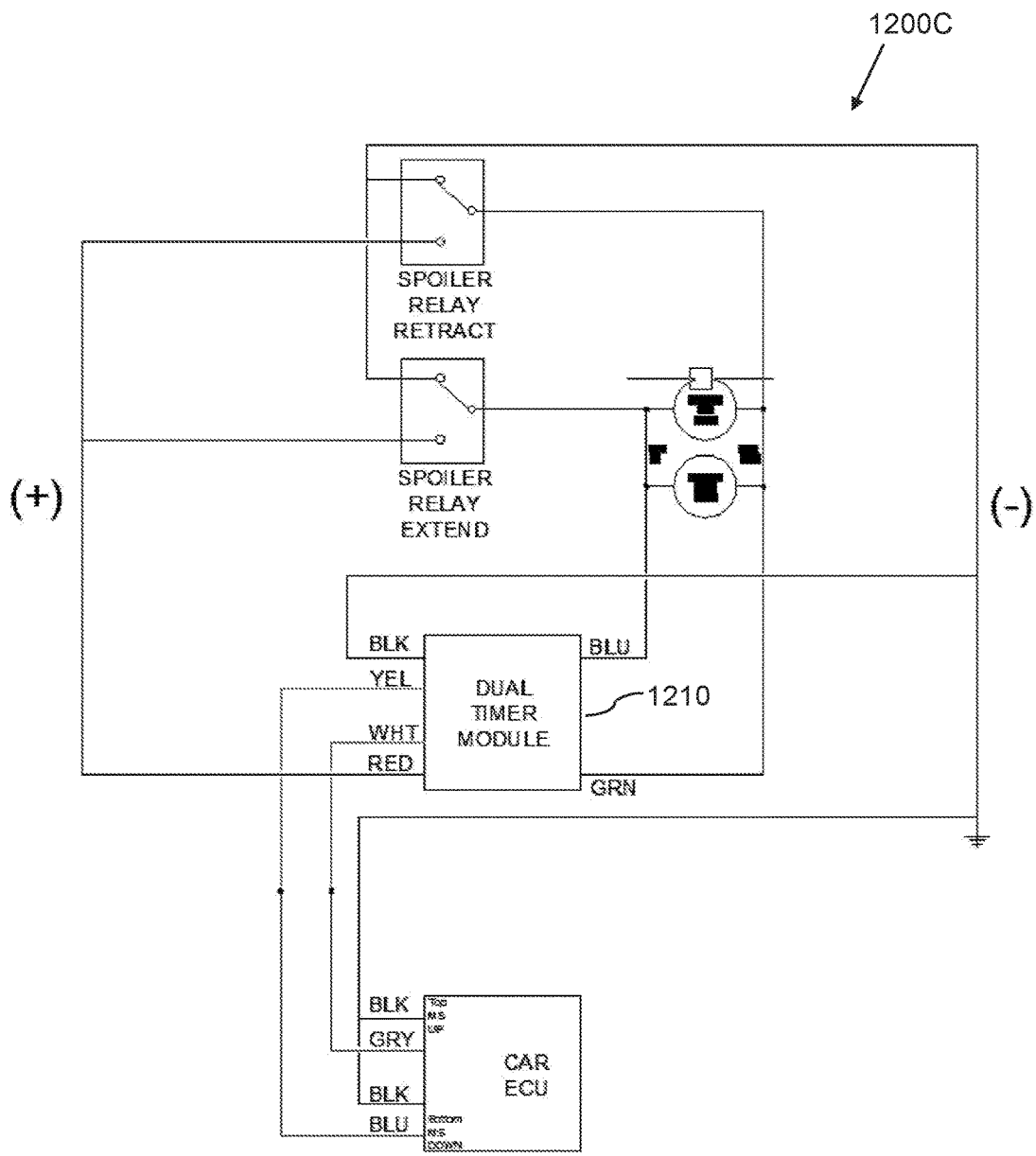

SPOILER WING EXTENSION AND RETRACTION SYSTEM

CROSS-REFERENCE TO RELATED APPLICATIONS

This application claims the benefit of U.S. Provisional Application No. 62/172,151, filed Jun. 7, 2015.

FIELD OF THE INVENTION

The present invention relates generally to the field of spoilers and wings for vehicles, and more particularly to methods and systems for lifting and lowering a spoiler or wing of a vehicle.

BACKGROUND OF THE INVENTION

Use of spoilers and wings, henceforth referred to as spoiler wings, are well-known for use in improving aerodynamic performance, grip, and stability of automotive vehicles.

Current systems utilize either a 1) fixed height airfoil spoiler wing, 2) scissor lift gear driven electro-mechanical system or 3) hydraulic fluid systems consisting of high pressure pump(s), tubing and spring loaded hydraulic cylinder(s) to extend or retract a detached vehicle spoiler wing.

Such systems, due to their inherent complexity tend to become inoperable after a short time, be space consuming and expensive to install.

As such, considering the foregoing, it may be appreciated that there continues to be a need for novel and improved devices and methods for lifting and lowering a spoiler or wing of a vehicle.

SUMMARY OF THE INVENTION

The foregoing needs are met, to a great extent, by the present invention, wherein in aspects of this invention, enhancements are provided to the existing model of spoiler wings devices and systems for installation in a vehicle.

In an aspect, a spoiler wing extension and retraction system for controlling a spoiler wing on a vehicle can include:
a) a vehicle mounting assembly, which is configured to be connected to a body of the vehicle;
b) a linear-motion device comprising:
  i. a main body, which is connected to the vehicle mounting assembly; and
  ii. an extendable shaft, which is configured to be moveable relative to the main body;
wherein an outer end of the extendable shaft is configured to connect to the spoiler wing of the vehicle, such that the linear-motion device is configured to lift and lower the spoiler wing.

In another aspect, a spoiler wing control system can include:
a) at least one spoiler wing extension and retraction system, comprising:
  i. a vehicle mounting assembly, which is configured to be connected to a body of the vehicle;
  ii. a linear-motion device comprising:
    a main body, which is connected to the vehicle mounting body; and
    an extendable shaft, which is configured to be moveable relative to the main body;
    wherein an outer end of the extendable shaft is configured to connect to the spoiler wing of the vehicle, such that the linear-motion device is configured to lift and lower the spoiler wing; and
b) a spoiler wing control unit, which is connected to the spoiler wing extension and retraction system;
wherein the spoiler wing control unit is configured to control the linear-motion device of the at least one spoiler wing extension and retraction system, and thereby control lifting and lowering of the spoiler wing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is an exploded rear perspective view of a spoiler wing extension and retraction system for mounting on a vehicle, according to an embodiment of the invention.

FIG. 3A is an exploded perspective view of an intermediate attachment assembly, according to an embodiment of the invention.

FIG. 4 is an exploded perspective view of a vehicle mounting assembly, according to an embodiment of the invention.

FIG. 5 is an exploded perspective view of parts of a vehicle mounting assembly, according to an embodiment of the invention.

FIG. 9 is a perspective view of a linear-motion device, according to an embodiment of the invention.

FIG. 12A is a diagram illustrating signal sequences corresponding to wing position for an error warning control process, according to an embodiment of the invention.

FIG. 12C is a schematic diagram illustrating a spoiler wing error warning control circuit, according to an embodiment of the invention.

DETAILED DESCRIPTION

Figure 2A:
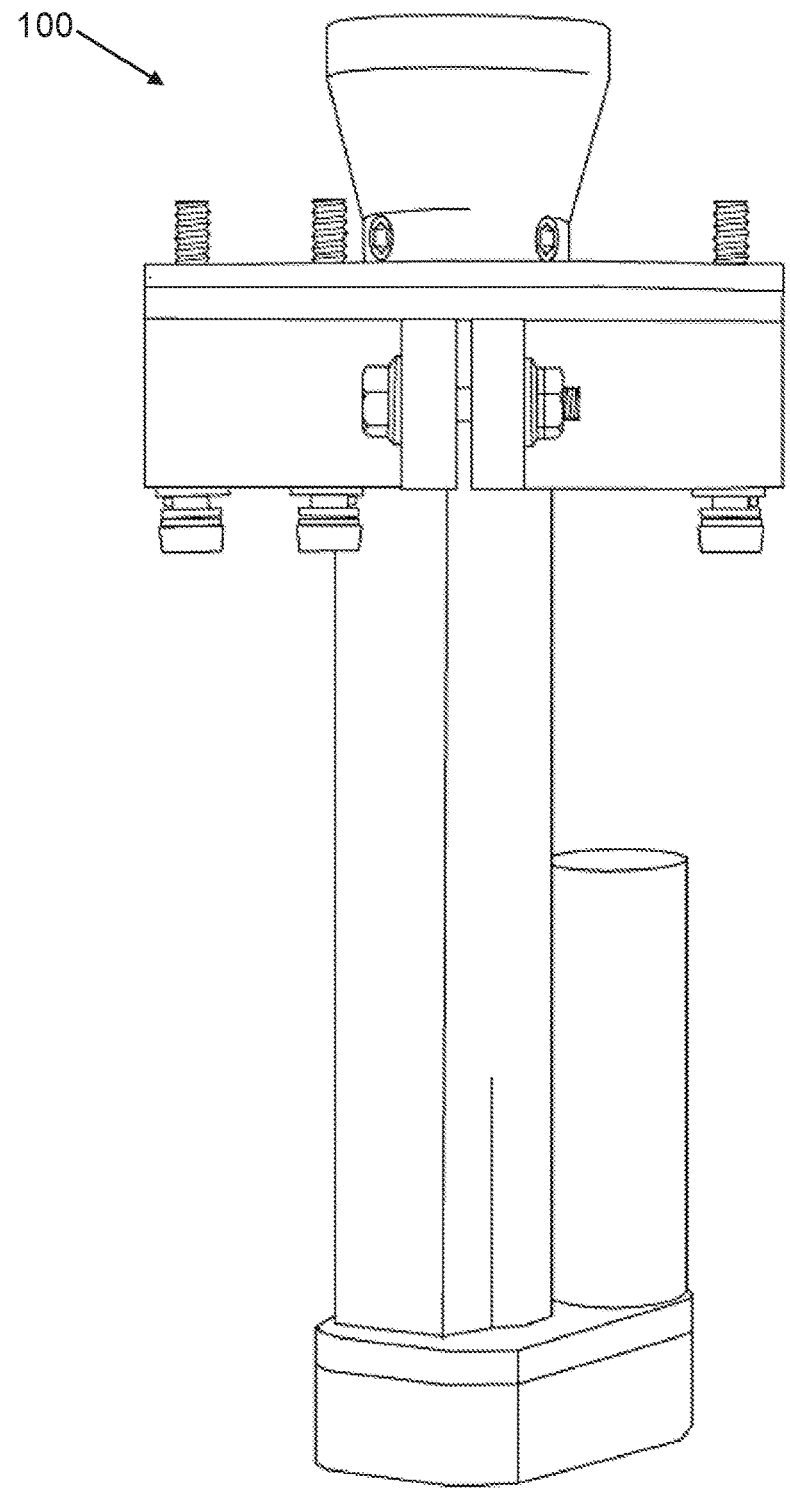
FIG. 2A is a side view of a spoiler wing extension and retraction system in an assembled and retracted configuration, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In an embodiment, FIG. 1 shows a rear perspective exploded view of a spoiler wing extension and retraction system 100 as mounted to the underside of a rear hinged lid of a vehicle.

In the following, we describe the structure of an embodiment of the spoiler wing extension and retraction system 100, with reference to FIG. 1, in such manner that like reference numerals refer to like components throughout; a convention that we shall employ for the remainder of this specification.

Figure 3B:
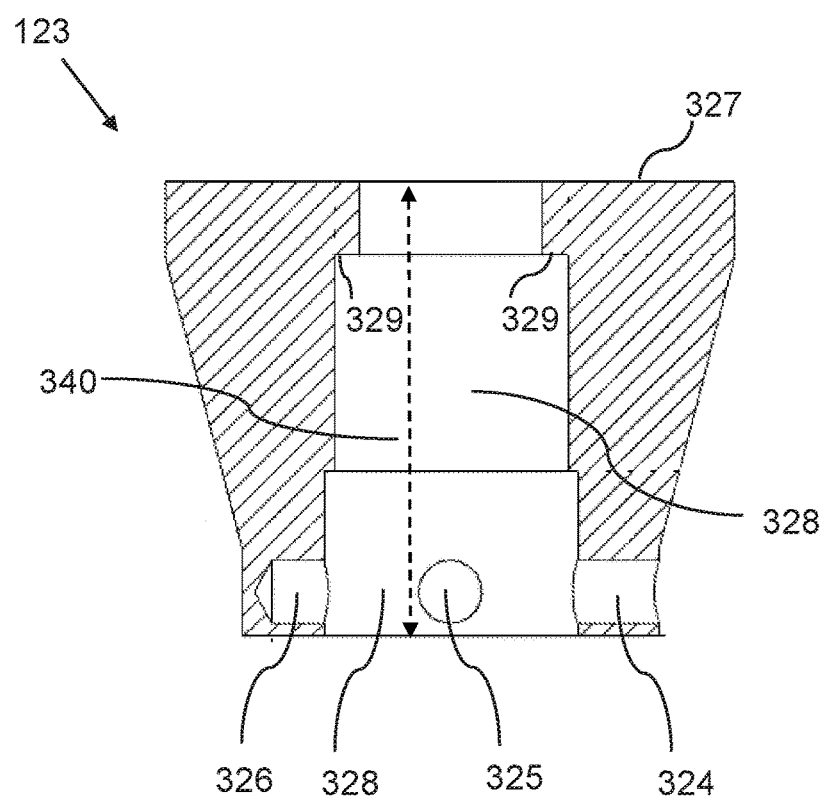
FIG. 3B is a cross-sectional view of an intermediate attachment device, according to an embodiment of the invention.
Figure 14:
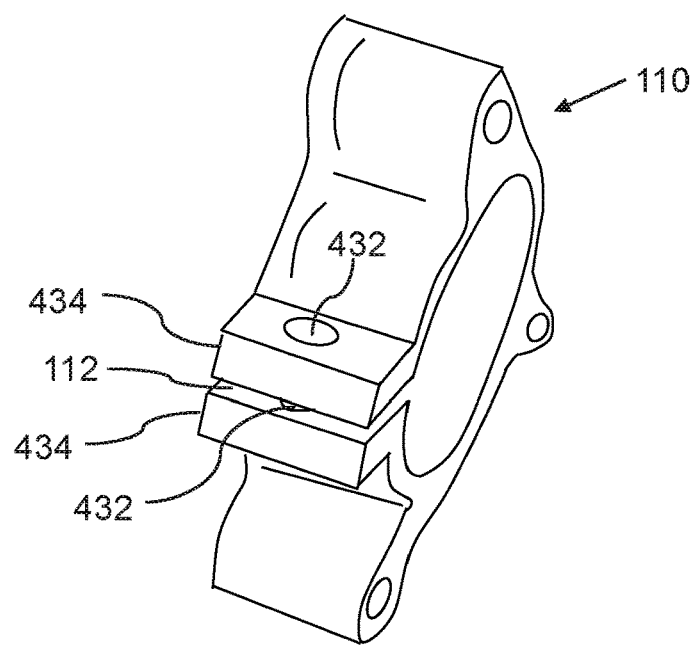
FIG. 14 is a perspective view of a spider clamp flange, according to an embodiment of the invention.

In an embodiment, as shown in FIG. 1, a spoiler wing extension and retraction system 100 can include:

a) a vehicle mounting assembly 160, which is configured to be mounted to a body of the vehicle, wherein the vehicle mounting assembly 160 can include:
 1) a circular insert 106, including:
  i. a longitudinal gap 107;
  ii. a bored out center aperture 108, also referred to as a central aperture 108, which is configured to match the cross-sectional dimensions and mount around the main body 104 of the linear-motion device 101;
  wherein the circular insert 106 is configured to be compressible, whereby the longitudinal gap 107 is reduced when the circular insert 106 is compressed;
  such that the circular insert 106 is mounted around the main body 104 of the linear-motion device 101;
 2) a spider clamp flange 110, including:
  i. a central bore 111, also referred to as a central aperture 111, which can be a circular central aperture 111, which is configured in a longitudinal direction of the spider clamp flange 110;
  ii. opposing flanges 432, as shown in FIGS. 4, 5, and 14, which are separated by a longitudinal clamp gap 112, wherein the opposing flanges 432 further comprise flange apertures 434; and
  iii. clamp bolt apertures 113, for fastening the vehicle mounting assembly 160 to a vehicle;
 3) a clamp bolt 141;
 4) a clamp nut 142, such that the clamp bolt 141 can be inserted through the flange apertures 434, such that the spider clamp flange 110 can be fastened in position around the circular insert 106 with the clamp nut 142;
 5) fasteners 140;
 6) a seal plate 118, including:
  i. seal bolt apertures 119; and
  ii. a central seal aperture 120, as shown in FIG. 4; and
 7) a spacer plate 114, including:
  i. spacer bolt apertures 115; and
  ii. a central spacer aperture 417, visible in FIG. 4;
 8) a shaft wiper seal 116, which is inserted into the central spacer aperture 417, as shown in FIG. 4;
 such that the circular insert 106 is free to rotate and be moved vertically within the vehicle mounting assembly 160 prior to clamping in position, such that the circular insert 106 is configured to be radially 452 and vertically 454 adjustable; and b) a linear-motion device 101, as shown in further detail in FIG. 3A, which can further include:
 9) a main body 104, which is connected to the vehicle mounting assembly; and
 10) an extendable shaft 102, which is configured to be moveable relative to the main body 104; and c) an intermediate attachment assembly 130, as shown in further detail in FIGS. 3A and 3B, which can include:
 11) at least one o-ring 122, which can be a compressible o-ring 122;
 12) an intermediate attachment device 123, which can include:
  i. an upper connecting surface 327, which is configured to establish a secure contact with an underside of the spoiler wing; and
  ii. a lower receiving cavity 328, which is configured to receive the extendable shaft 102, such that the extendable shaft 102 is connected to the intermediate attachment device 123;
   wherein the intermediate attachment device 123 is configured with a central aperture 340 going through the upper connecting surface 327 and the lower receiving cavity 328, in an elongated direction of the intermediate attachment device 123;
13) a spoiler wing threaded aperture 127, which is configured to receive a twist lock screw 121;
14) a first screw 143, which can be a set screw, including a short Allen screw 143;
15) a second screw 144, which can be a set screw, including a long Allen screw 144; and
16) a twist-lock screw 121, wherein the twist-lock screw 121 is configured to be inserted through the central aperture 340, such that a lower head 322 of the twist-lock screw is secured against an inner shelf 329 of the lower receiving cavity, and an upper end 323 of the twist-lock screw 121 is configured to lock into a locking aperture 127 on the underside of the spoiler wing;

wherein an outer end of the extendable shaft is configured to connect to the spoiler wing 128, which can be a detached spoiler wing 128, of the vehicle, via the intermediate attachment assembly 130, such that the linear-motion device 101 is configured to lift and lower the spoiler wing 128;

wherein an inner end of the intermediate attachment assembly 130 is connected to the outer end of the extendable shaft 102, such that an outer end of the intermediate attachment assembly 130 is configured to attach to the spoiler wing 128;

wherein the spider clamp flange 110 is mounted around the circular insert 106 and tightened in position, such that the vehicle mounting assembly 160 is securely connected to the main body 104 of the linear-motion device 101;

such that the vehicle mounting assembly 160 is configured to be connected to the body 150 of the vehicle, by inserting bolts 140 through the clamp bolt apertures 113, and securing the bolts 140 to the body 150 of the vehicle; such that the extendable shaft 102 protrudes through the central flange aperture, and up through a vehicle opening 151, such that the extendable shaft connects with the intermediate attachment device 123 on an outer side of the vehicle;

wherein the spacer plate 114 is configured to be positioned above the spider clamp flange 110, and the seal plate 118 is configured to be positioned above the spacer plate 114, such that a lip 418 of the shaft wiper seal 116 is configured to protrude through the central seal aperture 419;

wherein the seal bolt apertures 119 and the spacer bolt apertures 115 are aligned with the clamp bolt apertures 113;

such that the extendable shaft 102 protrudes through a central aperture 419 of the shaft wiper seal and through the central seal aperture 120;

such that the seal plate 118, spacer plate 114, and shaft wiper seal 116 form an environmental seal;

wherein the twist-lock screw 112 is inserted through the compressible o-ring 122, which is positioned between the lower head 322 of the twist-lock screw 121 and the inner shelf 329 of the lower receiving cavity 328;

wherein the extendable shaft 102 is secured in place with the first screw 144 passing through a first threaded receiving cavity aperture 324 and the linear-motion device aperture 303, and threaded into a blind threaded receiving cavity aperture 326, which is oppossedly positioned to the first threaded receiving aperture 324;

wherein the second screw 143 is threaded into a second threaded receiving cavity aperture 325 and locked against the extendable shaft 102 to secure the intermediate attachment device 130 to the extendable shaft 102.

Figure 13:
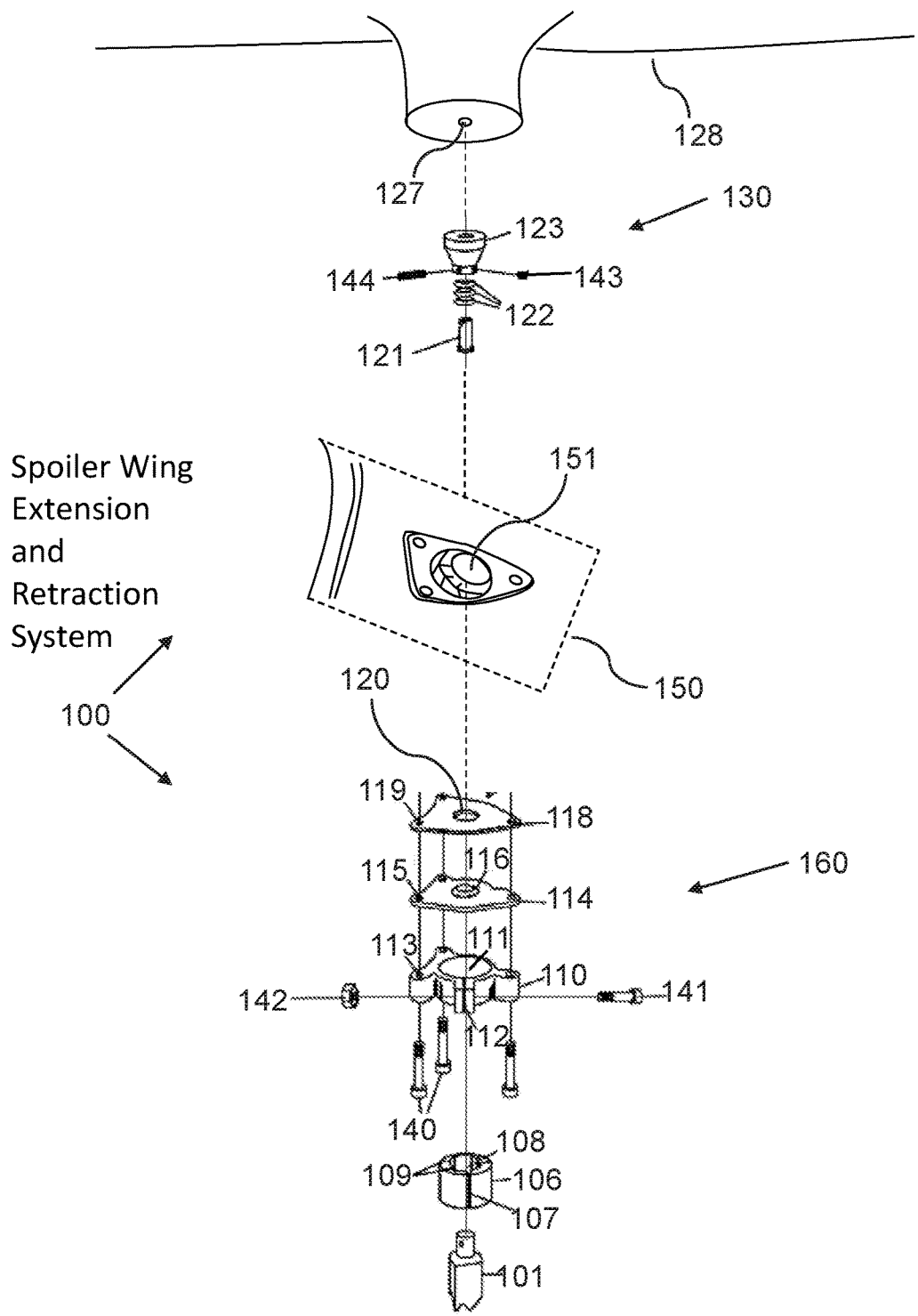
FIG. 13 is an exploded rear perspective view of a spoiler wing extension and retraction system for mounting on a vehicle, according to an embodiment of the invention.

FIG. 13, shows an exploded perspective view of the embodiment shown in FIG. 1, showing bottom/inner sides of the spoiler wing 128 and the rear deck lid 150 or body 150 of the vehicle.

In a related embodiment, FIG. 2A shows a side view of the spoiler wing extension and retraction system 100 in an assembled and retracted configuration.

Figure 2B:
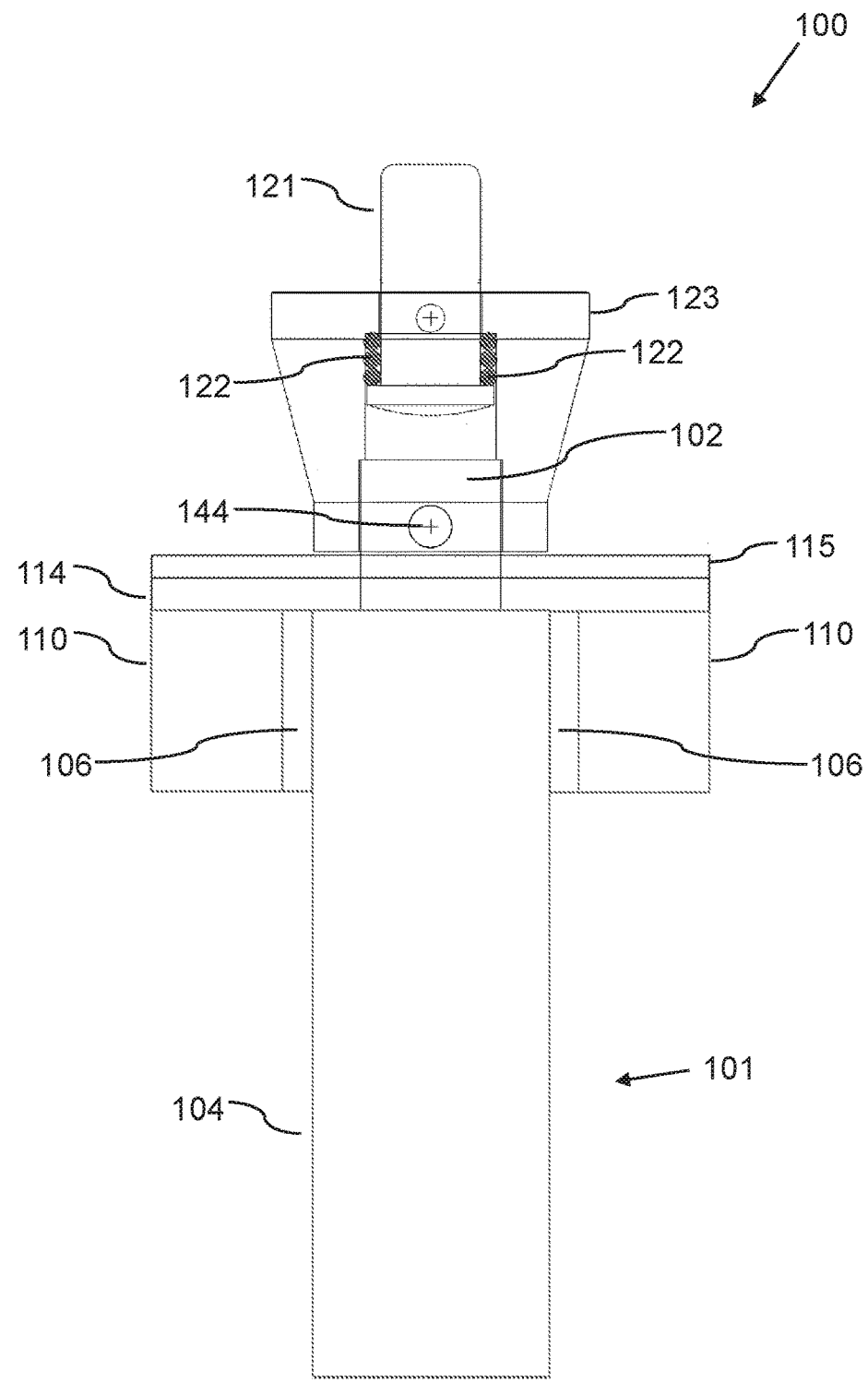
FIG. 2B is a cross-sectional side view of a spoiler wing extension and retraction system in an assembled and retracted configuration, according to an embodiment of the invention.

In a related embodiment, FIG. 2B shows a cross-sectional view of the spoiler wing extension and retraction system 100 in an assembled and retracted configuration.

In a related embodiment, FIG. 3A shows a perspective exploded view of the intermediate attachment assembly 130, which is configured to create a mechanical connection between the linear-motion device 101 and the spoiler wing 128, wherein:
   a) the intermediate attachment device 123 securely connects the linear-motion device 101 and spoiler wing 128;
   b) A twist-lock screw 121 end is attached to the spoiler wing aperture 127 through an aperture 126 at the top of the intermediate attachment device 123;
   c) Tension and a secure fit between the intermediate attachment device 123 and the spoiler wing 128 is maintained on the twist-lock screw 121 by means of one or more compressible o-ring(s) 122;
   d) The intermediate attachment device 123 slips onto the shaft 102 of the linear-motion device 101 and is secured in place by means of a long screw 144, which can be a long set screw 144 passing through a first threaded aperture 324 and the linear-motion device shaft aperture 303, and threaded into a blind threaded aperture 326, which is 180 degrees apart from the threaded aperture 324; and
   e) A short screw 143, which can be a short set screw 143, is threaded into a second threaded receiving cavity aperture 325 and locked against the extendable shaft 102 to secure the intermediate attachment device 123.

In a related embodiment, FIG. 3B shows a cross-sectional view of the intermediate attachment device 123.

Figure 15:
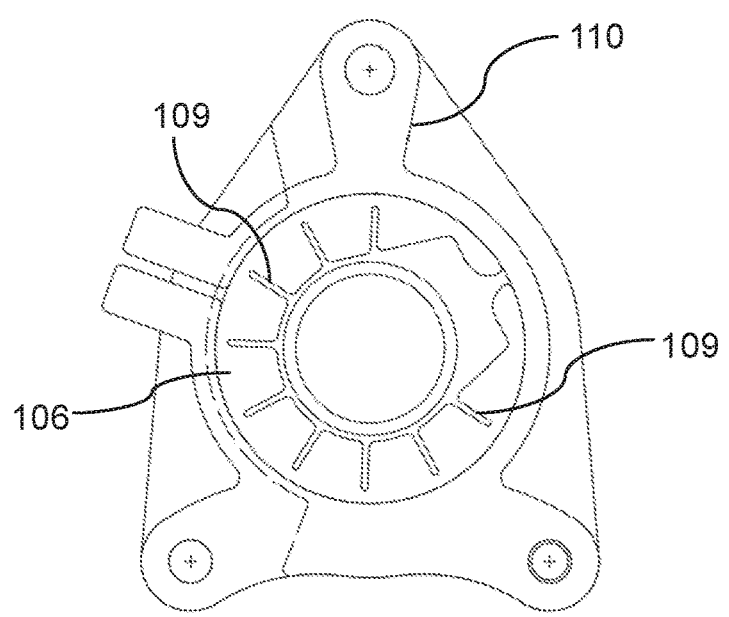
FIG. 15 is a top view of a circular insert mounted inside a spider clamp flange, according to an embodiment of the invention.

In a related embodiment, FIG. 4 shows an exploded perspective view of the vehicle mounting assembly 160, wherein:
   a) the circular insert 106 can include a bored out center aperture 108, which matches the external profile of the main body 104 of the linear-motion device 101;
   b) the circular insert 106 can be dimensionally equal to the outer profile of the linear-motion device 101, which requires the circular Insert 106 to be spread open about its longitudinal gap 107 in order to be slipped over the main body 104 of the linear-motion device 101;
   c) the circular insert 106 can include radial notches 109, which are configured on an inner side of the circular insert 106, in a longitudinal direction of the circular insert 106, such as shown in FIGS. 4 and 15, such that the radial notches 109 working in conjunction with the longitudinal gap 107, allow expansion of the circular insert 106 about a center point of the circular insert 106 when spread open, and thereby enable the circular insert 106 to fit around the main body 104 of the linear-motion device 101;

d) the circular insert 106 can be dimensionally equal to a central aperture 111 of the spider clamp flange 110, which requires the spider clamp flange 110 to be spread open about its longitudinal clamp gap 112 in order to be slipped over the circular Insert 106;

e) the spacer plate 114 can include a central aperture 417, which is the same diameter as the outer diameter of the shaft wiper seal 116, whereby the shaft wiper seal 116 is positioned into the central aperture 417;

f) the shaft wiper seal 116 can provide a weather tight seal between the elements external to the vehicle and the vehicle mounting assembly 160 and the linear-motion device 101 positioned below the vehicle rear deck lid;

g) The diameter of a central aperture 419 of the shaft wiper seal 116 can be substantially the same or slightly lesser diameter as the extendable shaft 102 of the linear-motion device 101, such that the extendable shaft 102 can pass through the shaft wiper seal 116; and h) The seal plate 118 can have a central seal aperture 120, which is slightly bigger than the lip 418 of the shaft wiper seal 116 allowing the lip 418 to pass through freely.

In a related embodiment, FIG. 5 shows an exploded perspective view of parts of the vehicle mounting assembly 160 (not showing the circular insert 106), including one or more screw end fastener(s) 140 for attachment of the vehicle mounting assembly 160 with the linear-motion device 101 onto the inner/bottom side of the rear deck lid 150 or body 150 of a vehicle. The clamp bolt 141 and nut 142 can be tightened to secure the spider clamp flange 110 around the circular insert 106.

Figure 6:
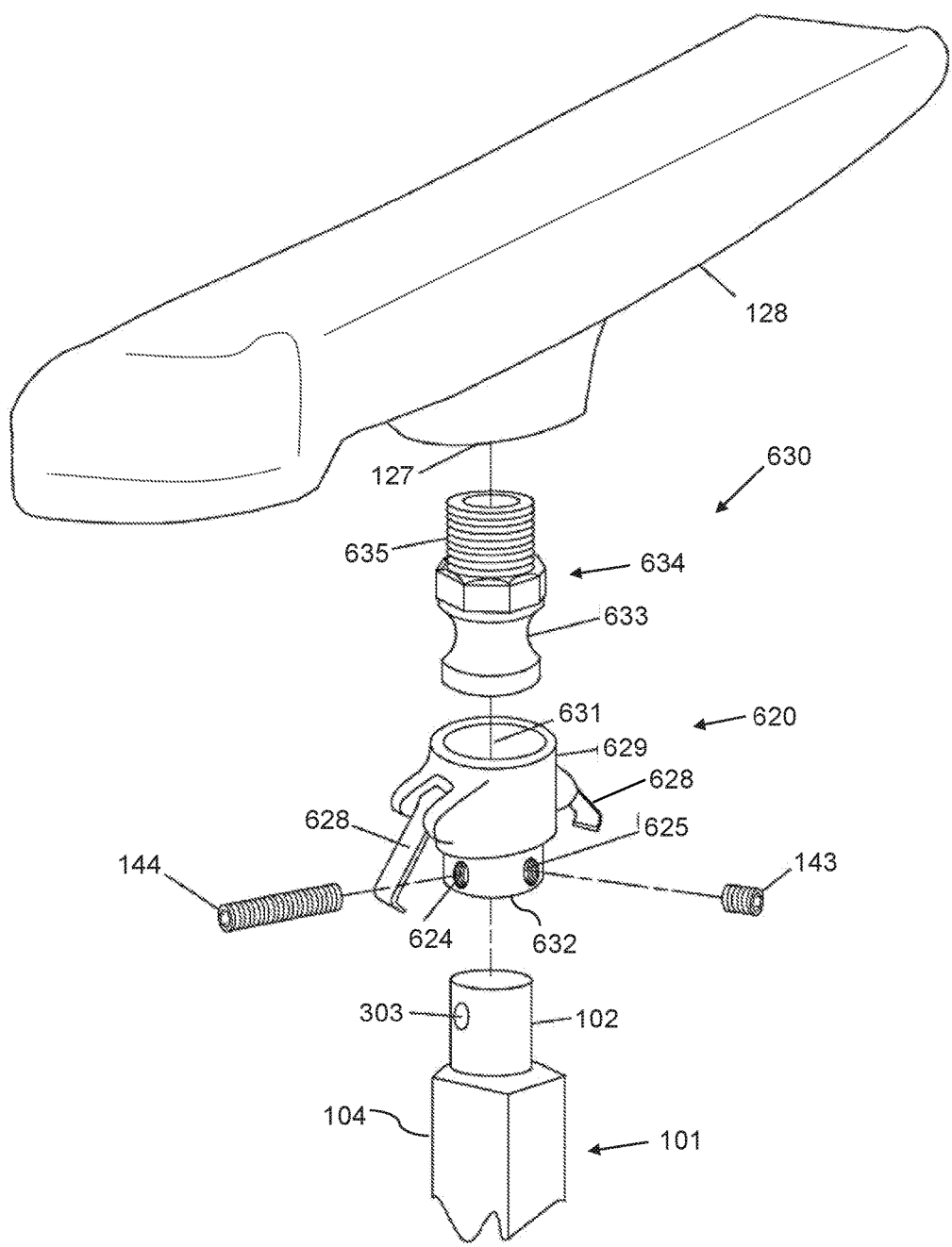
FIG. 6 is an exploded perspective view of an intermediate attachment assembly, according to an embodiment of the invention.

In a related embodiment, FIG. 6 shows an exploded perspective view of an intermediate attachment assembly 630, which connects the linear-motion device 101 with the spoiler wing 128, wherein the intermediate attachment assembly 630 can include:

a) an intermediate attachment device, comprising:
  a male cam lock fitting 634, which can include:
    a threaded portion 635, which is positioned in an upper part of the male cam lock fitting 634; and
    a connector portion 633, which is connected to the threaded portion, such that the connector portion 633 is positioned in a lower part of the male cam lock fitting 634; and
  a female cam-lock assembly 620, which can include:
    a cam-lock body 629, comprising an upper cavity 631; and
    cam-locks 628, which are oppossedly positioned and connected to the cam-lock body 629, such that the cam-locks 628 are rotatably depressible;
    a lower receiving cavity 632, which can be configured to receive the extendable shaft 102, such that the extendable shaft 102 is connected to female cam-lock assembly 620;
  wherein the connector portion 633 of the male cam lock fitting 634 is inserted into the upper cavity 631 of the cam-lock body 629, such that the male cam lock fitting 634 is securely connected to the female cam-lock assembly 620 when the cam-locks 628 are rotated inwards;
such that the threaded portion 635 of the male cam lock fitting 634 is configured to screw into a threaded aperture 127 on the underside of the spoiler wing 128;

wherein further:

a) A female cam-lock assembly 620 together with a male insert 634 make up the intermediate attachment assembly 630 that bridges between the linear-motion device 101 and the spoiler wing 128;

b) A male cam lock fitting 634 can include threads 635, which can be threaded into a threaded aperture 127, which is an integral component of the spoiler wing 128;

c) The female cam-lock assembly 620 can be configured to slip onto the shaft 102 of the linear-motion device 101 and be secured in place by means of a long screw 144 screwed into the threaded aperture 624 and freely passing through the linear-motion device 101 shaft aperture 303, thus screwed into a blind threaded aperture 324, similar to the blind threaded aperture 326, 180 degrees apart from the threaded hole 624;

d) A short screw 143 can be threaded into a threaded aperture 625 of the female cam-lock assembly 620, and locked against the extendable shaft 102 to secure the female cam-lock assembly 620 to the shaft 102 of the linear-motion device 101; and e) The male cam lock fitting 634 can be inserted into the upper cavity 631 of the female cam-lock assembly 620, whereby cam-locks 628 positioned 180 degrees apart are rotated to securely lock the cam lock fitting connector portion 633 to the female cam-lock assembly 620.

Figure 7:
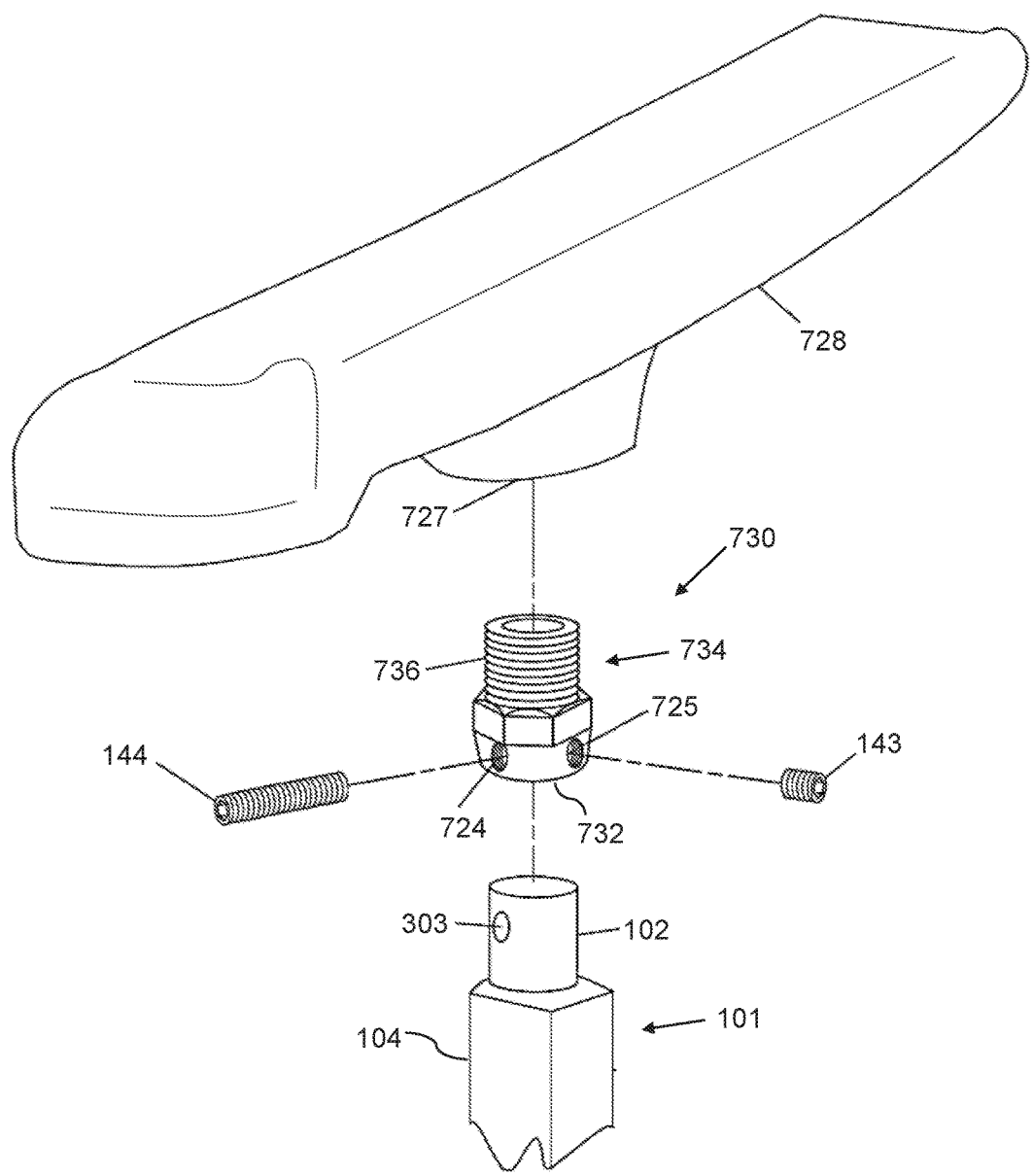
FIG. 7 is an exploded perspective view of an intermediate attachment assembly, according to an embodiment of the invention.

In a related embodiment, FIG. 7 shows an exploded perspective view of a threaded intermediate attachment assembly 730, which is threaded into the threaded aperture 727 integral to spoiler wing 728, wherein the threaded intermediate attachment assembly 730 can include:

a) an intermediate attachment device 734,
  configured as a threaded single body fitting 734, comprising:
    a threaded portion 736, which is positioned in an upper part of the threaded single body fitting 734; and
    a lower receiving cavity 732, which is connected to the threaded portion 736, such that the lower receiving cavity 732 is configured to receive the extendable shaft 102, such that the extendable shaft 102 is connected to the threaded single body fitting 734;
such that the threaded portion is configured to screw into a threaded aperture 727 on the underside of the spoiler wing 728;

wherein further:

b) The opposite end of the threaded intermediate attachment assembly 736 can be configured to slip fit over the extendable shaft 102 of the linear-motion device 101 and can be secured in place by means of a long screw 144 screwed into the threaded hole 724 and freely passing through the linear-motion device 101 shaft aperture 303, thus screwed into a blind threaded aperture 180 degrees apart from the threaded aperture 724; and c) A short screw 143 can be threaded into a hole 725 and locked against the extendable shaft 102 to secure the threaded intermediate attachment assembly 736 to the extendable shaft 102.

Figure 8:
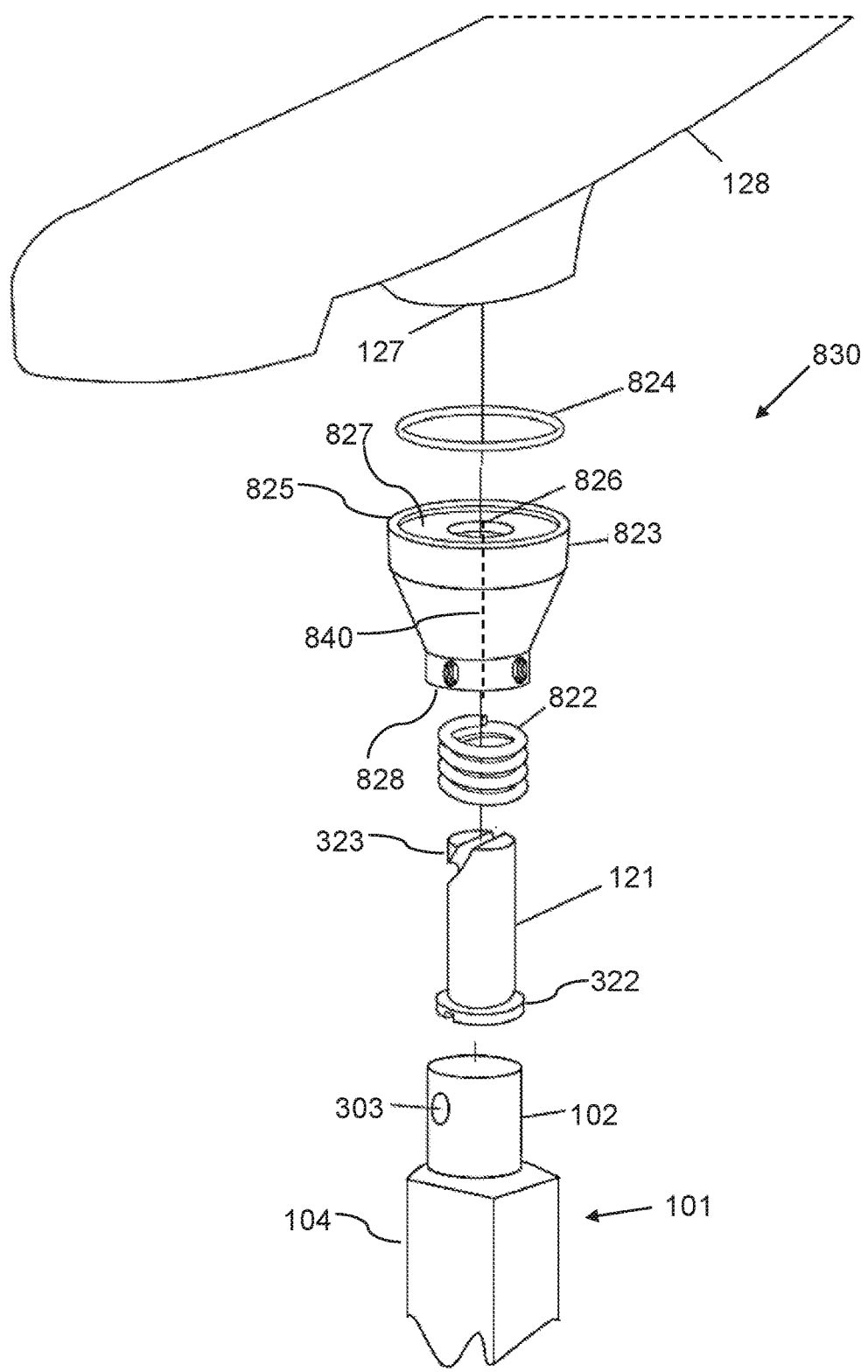
FIG. 8 is an exploded perspective view of an intermediate attachment assembly, according to an embodiment of the invention.

In a related embodiment, FIG. 8 shows an exploded perspective view of an intermediate attachment assembly 830, which can include:

a) a top o-ring 824;
b) an intermediate attachment device 823, comprising:
    an upper connecting surface 827, which is configured to establish a secure contact with an underside of the spoiler wing, wherein the upper connecting surface further comprises
        a sealing wall 825, peripherally positioned on an upper surface of the upper connecting surface 827; and
    a lower receiving cavity 828, which is configured to receive the extendable shaft 102, such that the extendable shaft 102 is connected to the intermediate attachment device 823;
    wherein the intermediate attachment device 823 is configured with a central aperture 840 going through the upper connecting surface 827 and the lower receiving cavity 828, in an elongated direction of the intermediate attachment device 823; and
c) a twist-lock screw 121;
wherein the twist-lock screw 121 is configured to be inserted through the central aperture 840, such that a lower head 322 of the twist-lock screw is secured against an inner shelf 329 of the lower receiving cavity 828, and an upper end 323 of the twist-lock screw 121 is configured to lock into a locking aperture 127 on the underside of the spoiler wing 128;
wherein the top o-ring 824 can be mounted inside the peripheral sealing wall 825, such that the top o-ring 824 provides a spring tensioning configuration for a twist-lock screw 121. The spring 822 slips over the shaft of the twist-lock screw 121, such that the spring 822 is positioned between the lower head 322 of the twist-lock screw 121 and the inner shelf 329 of the lower receiving cavity 828, whereby tension and secure fit between the intermediate attachment device 830 and the spoiler wing 128 is maintained by the twist-lock screw 121.

In a related embodiment, FIG. 9 shows a perspective view of an electromechanical linear-motion device 101, including:

a) An extendable shaft 102, including a shaft aperture 303, which extends through the extendable shaft 102, in a direction that is perpendicular to an elongated direction of the extendable shaft 102;
b) An electric motor 904; and
c) A transmission 905, contained with a housing;
wherein the electric motor 904 is coupled to the extendable shaft 102 via the transmission 905, in order to enable extension and retraction of the extendable shaft 102.

In related example embodiments, an electromechanical linear-motion device 101 can be a linear actuator from Tampa Motions Company™ with model number LA-01, LA-02, LA-03, LA-04, LA-05, or LA-06™. Extended length of the linear actuator can be specified from 2 inch (or 50 mm) through 30 inch (or 760 mm). The speed of the linear actuator can vary from 1 mm/second to 100 mm/second. In other embodiments a linear motion device can be a pneumatic linear actuator.

In related embodiments, selection or interchange of a particular electromechanical linear-motion device 101 can be done to increase/decrease deployment speed or force, or change the extended length. Change of the make/type/model of the electromechanical linear-motion device 101 used in the spoiler wing extension and retraction system 100 thereby allows flexibility and adjustability in use. In related embodiments, a raised or lowered height of the electromechanical linear-motion device 101 can be "permanently" fixed to any position between fully down and fully extended.

Figure 10A:
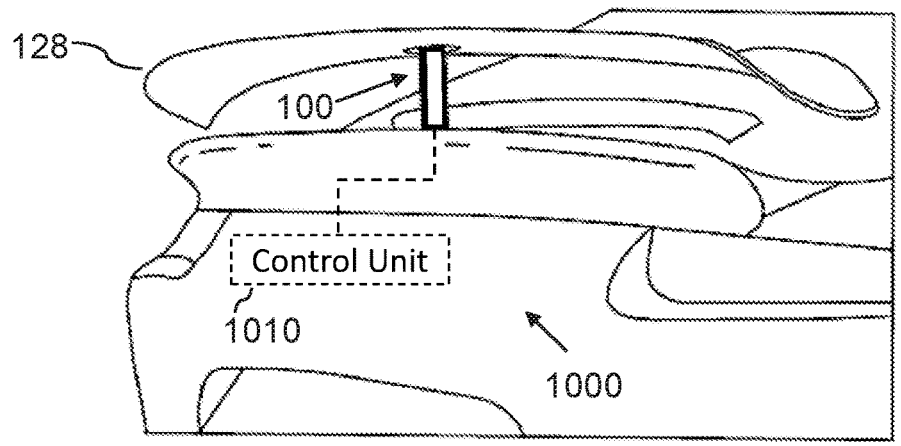
FIG. 10A is a rear perspective view of a vehicle with a spoiler wing attached to one spoiler wing extension and retraction system, according to an embodiment of the invention.

In a related embodiment, FIG. 10A shows a rear perspective view of a vehicle with a spoiler wing 128 attached to one spoiler wing extension and retraction system 100, which is attached to a rearward end of the vehicle, such that the one spoiler wing extension and retraction system 100 is configured to lift and lower the spoiler wing 128.

Figure 10B:
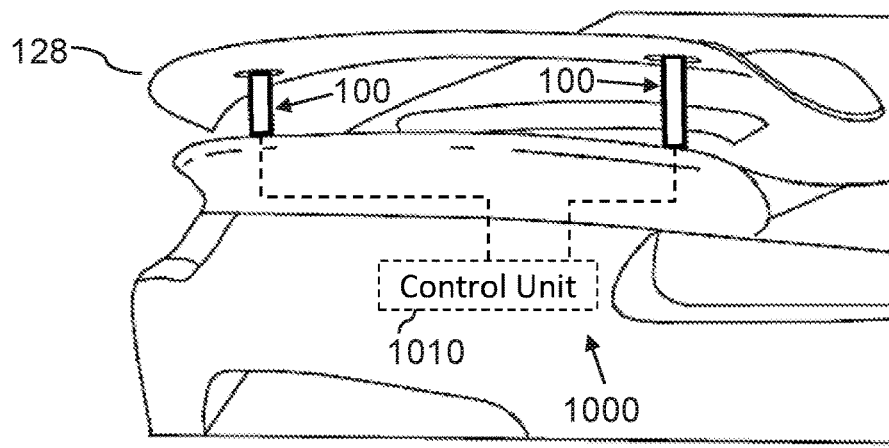
FIG. 10B is a rear perspective view of a vehicle with a spoiler wing attached to two spoiler wing extension and retraction systems, according to an embodiment of the invention.

In a related embodiment, FIG. 10B shows a rear perspective view of a vehicle with a spoiler wing 128 attached to two spoiler wing extension and retraction systems 100, which are attached to a rearward end of the vehicle, such that the two spoiler wing extension and retraction systems 100 are configured to lift and lower the spoiler wing 128.

Figure 10C:
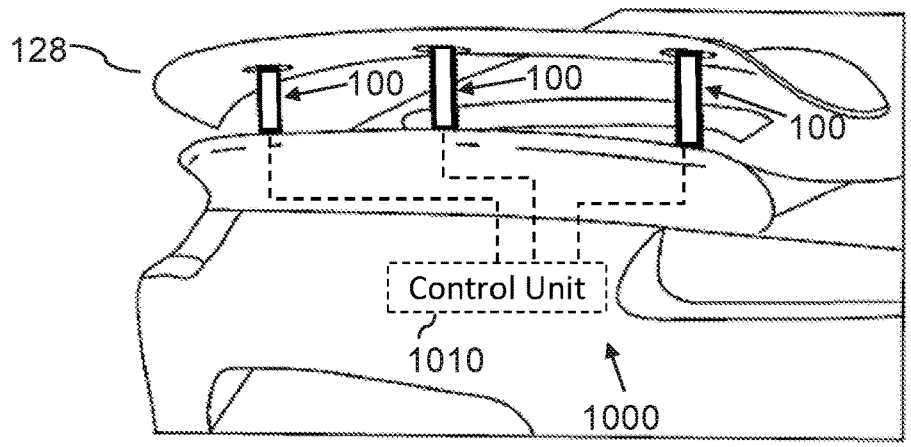
FIG. 10C is a rear perspective view of a vehicle with a spoiler wing attached to three spoiler wing extension and retraction systems, according to an embodiment of the invention.

In a related embodiment, FIG. 10C shows a rear perspective view of a vehicle with a spoiler wing 128 attached to three spoiler wing extension and retraction systems 100, which are attached to a rearward end of the vehicle, such that the three spoiler wing extension and retraction systems 100 are configured to lift and lower the spoiler wing 128.

In a further related embodiment, as shown in FIGS. 10A, 10B, and 10C, a spoiler wing control system 1000 can include, at least one spoiler wing extension and retraction system 100 which is connected to a spoiler wing control unit 1010, such that the spoiler wing control unit 1010 is configured to control the linear-motion device 101 of the at least one spoiler wing extension and retraction system 100, and thereby control lifting and lowering of the spoiler wing 128.

Figure 11:
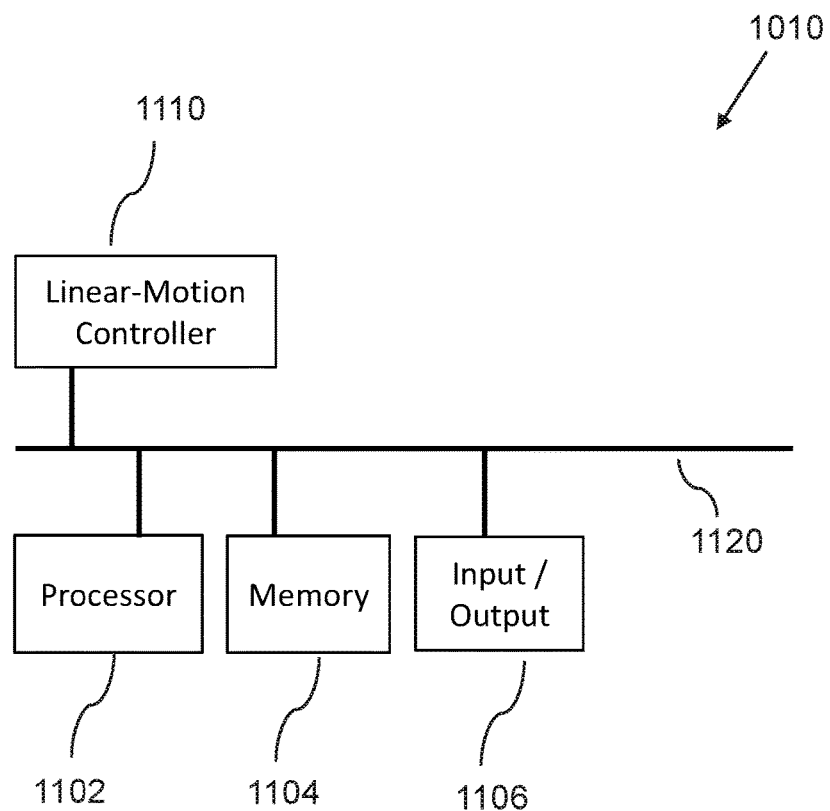
FIG. 11 is a schematic diagram illustrating a spoiler wing control unit, according to an embodiment of the invention.

In a related embodiment, as shown in FIG. 11, a spoiler wing control unit 1010 can include:
a) A processor 1102;
b) A non-transitory memory 1104;
c) An input/output component 1106;
d) A linear-motion controller 1110; all connected via
e) A data bus 1120;
wherein the linear-motion controller 1110 is configured to control the linear-motion device 101 of a spoiler wing extension and retraction system 100, and thereby control lifting and lowering of a spoiler wing 128, which is connected to the spoiler wing extension and retraction system 100.

Figure 12B:
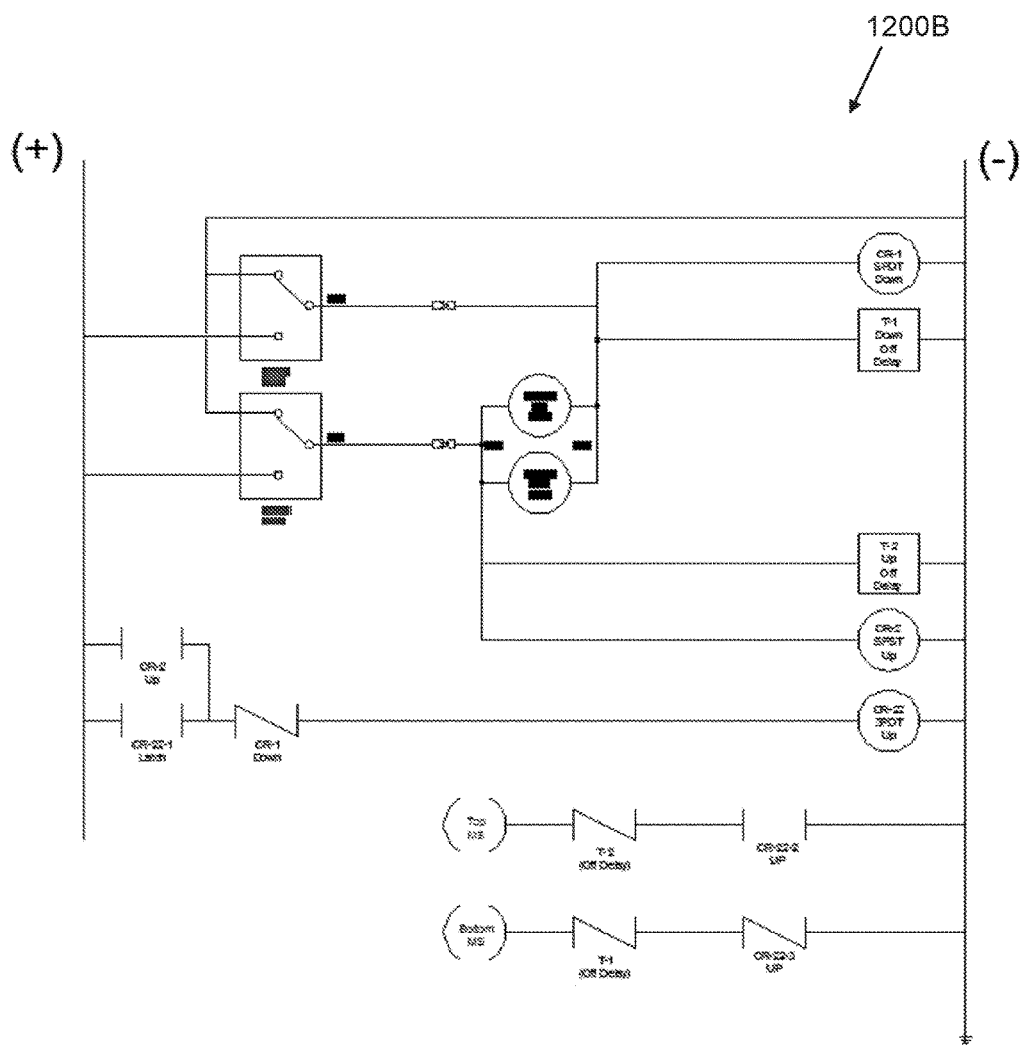
FIG. 12B is a schematic diagram illustrating a spoiler wing error warning control circuit, according to an embodiment of the invention.

In a related embodiment, functions of the spoiler wing control unit 1010 can instead be provided by a spoiler wing control circuit 1200 B/C/D/E, as shown in FIGS. 12B-12C, wherein control logic is implemented in electronic hardware to control the linear-motion device 101.

In a further related embodiment, the spoiler wing control circuit 1200 B/C/D/E can be configured as a spoiler wing error warning control circuit 1200 B/C/D/E, which can include a dual timer Electric Control Device 1210 (ECD), which is configured to implement an error warning control process, which is configured such that a spoiler error warning signal is not displayed on the vehicle's operator interface panel by providing electrical feedback delay to the vehicle Electric Control Unit (ECU). In a related embodiment, the error warning control process can be implemented in the linear-motion controller 1110 of the spoiler wing control unit 1010.

In a related embodiment, an error warning control process, implemented in the spoiler wing error warning control circuit 1200 B/C/D/E (or alternatively in the spoiler wing control unit 1010) can include the following states and process steps:

1) Beginning (deactivated or rest) State:
   a) Vehicle not moving and/or has not yet reached high speed condition and/or dash button is not activated.
      i) Spoiler Wing is in lowered (resting) position.
      ii) Spoiler Wing Control Unit (SWCU) is off.
      iii) Electric current is present in two logic circuits (Extended and Retracted) from vehicle Electronic Control Unit (ECU)
         (1) Extended circuit is open—no current flow through SWCU circuit relay.
         (2) Retracted circuit is closed—current flowing through SWCU circuit relay.
         (3) Circuit from ECU to Spoiler Wing extend relay is open—no current flow to SWCU logic circuit or Electro-Mechanical Assembly or Assemblies (E-MA).
         (4) Circuit from ECU to Spoiler Wing retract relay is open—no current flow to SWCU logic circuit or Electro-Mechanical Assembly or Assemblies (E-MA).
2) Vehicle reaches Spoiler Wing extend at high speed condition:
   a) (ECU) provides power to Extend Relay.
      i) Extend Relay contact is closed providing positive power to:
         (1) E-MA, such that:
            (a) E-MA motor(s) is energized in forward direction and mechanically extends Spoiler Wing to a predetermined height, whereby E-MA motor(s) is deactivated by a built in top relay causing electric current to be disconnected to the motor(s).
         (2) Spoiler Wing Control Unit (SWCU), such that:
            (a) SWCU Retract contact is opened.
            (i) Retracted ECU circuit is open—no current flow.
            (b) SWCU Extend delay timer is activated.
            (c) When predetermined time approximately equal to the E-MA extend time is reached, Extend contact is closed—current flowing from ECU Extended Condition Switching logic.
            (i) ECU current to extend relay is shut off, such that:
               1. Current shut off to SWCU logic.
               2. Current shut off to E-MA motor(s).
3) Vehicle subsequently reaches Spoiler Wing retract at low speed condition:
   a) (ECU) provides power to Retract Relay.
      i) Retract Relay contact is closed providing positive power to:
      ii) Electro-Mechanical Assembly or Assemblies (E-MA).
         (1) E-MA motor(s) is energized in reverse direction and mechanically retracts Spoiler Wing to a predetermined height, whereby E-MA motor(s) is deactivated by a built in bottom relay causing electric current to be disconnected to the motor(s).
      iii) Spoiler Wing Control Unit (SWCU)
         (1) SWCU Extend contact is opened.
            (a) Extended ECU circuit is open—no current flow.
         (2) SWCU Retract delay timer is activated.
         (3) When predetermined time approximately equal to the E"MA retract time is reached, Retract contact is closed—current flowing from ECU Retracted Condition Switching logic
            (a) ECU current to retract relay is shut off
               (i) Current shut off to SWCU logic.
               (ii) Current shut off to E-MA motor(s).
4) Spoiler Extend Dash Button is Momentarily Pushed (Activated):
   a) (ECU) provides power to Extend Relay.
      i) Extend Relay contact is closed providing positive power to:
      ii) Electro-Mechanical Assembly or Assemblies (E-MA).
         (1) E-MA motor(s) is energized in forward direction and mechanically extends Spoiler Wing to a predetermined height, whereby E-MA motor(s) is deactivated by a built in top relay causing electric current to be disconnected to the motor(s).
      iii) Spoiler Wing Control Unit (SWCU)
         (1) SWCU Retract contact is opened.
            (a) Retracted ECU circuit is open—no current flow.
         (2) SWCU Extend delay timer is activated.
         (3) When predetermined time approximately equal to the E-MA extend time is reached, Extend contact is closed—current flowing from ECU Extended Condition Switching logic
            (a) a. ECU current to extend relay is shut off
               (i) Current shut off to SWCU logic.
               (ii) Current shut off to E-MA motor(s).
5) Spoiler Retract Dash Button is Pushed and Held In (Activated):
   a) (ECU) provides power to Retract Relay.
      i) Retract Relay contact is closed providing positive power to:
      ii) Electro-Mechanical Assembly or Assemblies (E-MA).
         (1) E-MA motor(s) is energized in reverse direction and mechanically retracts Spoiler Wing to a predetermined height, whereby E-MA motor(s) is deactivated by a built in bottom relay causing electric current to be disconnected to the motor(s).
      iii) Spoiler Wing Control Unit (SWCU)
         (1) SWCU Extend contact is opened.
            (a) Extended ECU circuit is open—no current flow.
         (2) SWCU Extend delay timer is activated.
         (3) When predetermined time approximately equal to the E-MA retract time is reached, retract contact is closed—current flowing from ECU Retracted Condition Switching logic.
            (a) ECU current to retract relay is shut off
               (i) Current shut off to SWCU logic.
               (ii) Current shut off to E-MA motor(s).

In a related embodiment, FIG. 12A shows a schematic diagram for the signal sequences corresponding to the error warning control process, as implemented in the spoiler wing control circuit 1200 B/C/D/E.

In a related embodiment, FIG. 12B shows a schematic diagram of the spoiler wing control circuit 1200B.

In a related embodiment, FIG. 12C shows a schematic diagram of the spoiler wing control circuit 1200C.

Thus, in various embodiments, one or more assemblies consisting of a pre-assembled extendable shaft driven by an electric motor linear-motion device that is clamped to an adjustable assembly which is fastened to the vehicle, typically under the rear lid. The extendable shaft of the linear motion device is connected to a detached spoiler wing assembly by means of an intermediate adapter assembly. The vehicle's Electrical Control Unit (ECU) computer which controls current flow to the motor, whereby the motor direction causes the shaft and spoiler wing assembly to extend or retract through the linear-motion device gear driven transmission and ball screw assembly or by similar means. A separate Electric Control Device (ECD) is wired to the ECU spoiler wing control circuit whereby following a spoiler wing extension or retraction event, a delayed signal is fed to the ECU such that an error signal is not displayed on the vehicle's operator interface panel.

Various embodiments of the spoiler wing extension and retraction system 100 can include:

a) A spoiler wing extension and retraction system 100 including an electro-mechanical assembly for raising and lowering a spoiler wing assembly on a motor vehicle, comprised of a vehicle mounting assembly connected to a linear-motion device that is fastened to a motor vehicle whereby a spoiler wing assembly is fastened to a linear motion assembly by means of an intermediary attachment assembly, wherein the spoiler wing assembly is moveable by one or more electro-mechanical assemblies from a fully retracted position to a fully extended position and vice versa or to a predetermined fixed intermediary position or series of predetermined fixed positions or to any manually selected intermediary position by means of an electrical controller, wherein i. In a related embodiment, one or more linear motion electro-mechanical assemblies can be utilized to change the vertical position of the spoiler wing assembly by means of a pre-assembled electrical motor driven linear motion device with integrated mechanically driven extendable and retractable shaft;

ii. In a related embodiment, the spoiler wing extension and retraction system 100 can include at least one electro-mechanical assembly, more commonly two electro-mechanical assemblies, but possibly 3 or more electro-mechanical assemblies;

b) The spoiler wing extension and retraction system 100 according to item a), including an electro-mechanical assembly, as viewed from the back end of the vehicle, which is arranged approximately in the center of the vehicle or the spoiler wing for one device or approximately equally spaced from the outer sides of the vehicle or ends of the spoiler wings for plural devices or approximately equally spaced apart for three (3) or more devices.

c) The spoiler wing extension and retraction system 100 according to item a), including a vehicle mounting assembly which allows for adjustment of a linear motion device by changing the position of the linear motion device horizontally and/or vertically and/or radially.

In related embodiments:

iii. The vehicle mounting assembly may able to be adjusted and subsequently clamped or otherwise secured into a fixed position to prevent movement of the linear motion device and all other attached components;

iv. Clamping or tightening of an outer circular ring assembly about an inner rotatable Inserted component can be enabled with cam locks, bolt and nut, tapered threaded ring, screw band hose clamp, worm drive hose clamp, or other similar means; and/or v. The outer ring assembly may include teeth or paws to allow for segmented adjustment of the rotatable Inserted component.

d) The spoiler wing extension and retraction system 100 according to item c), wherein the vehicle attachment assembly includes one or more components to provide sealing of the linear motion device shaft and electro-mechanical and clamping components below the vehicle attachment assembly, to protect from the external environment, such that the vehicle attachment assembly may include shaft seal component or components to protect the electro-mechanical portion and all attached components from the external environment by means of a wiper seal component mounted within the vehicle attachment assembly. In a related embodiment:

vi. The said vehicle attachment device can include an outer component for attachment to the vehicle and for securing a rotatable inserted component with longitudinal slit for compression and subsequent clamping around an extruded shape and more specifically for adapting the rotatable inserted component to various linear motion device cross sectional area profiles.

e) The spoiler wing extension and retraction system 100 according to item a), wherein the linear motion device has an extendable and retractable shaft that is directly or indirectly secured to the spoiler wing assembly, or by means of an intermediary attachment assembly, which is secured to the spoiler wing assembly.

f) The spoiler wing extension and retraction system 100 according to item c), wherein the linear motion device shaft or an intermediary attachment assembly provides a mechanical attachment to the spoiler wing assembly by means of a male or female threaded connector, a twist lock connector, a cam lock connector, a mechanically expandable connector, a mechanically contractible connector or a combination of one or more of these, the mechanical arrangement assembly directly connected to the spoiler wing assembly, and the linear motion device moveable shaft end. In a related embodiment:

vii. The intermediary attachment assembly can include a mechanical spring and/or compressible rubber elements and/or o-rings to provide protection sealing against the ambient environment and to provide resistance to unintended disconnection between the spoiler wing assembly and the linear motion device shaft.

g) The spoiler wing extension and retraction system 100 according to item a), wherein an integrated or external electrical control system is electrically connected to the vehicle wiring and/or to the vehicle central computer for actuation of the spoiler wing assembly from the fully lowered or fully extended position to at one or more pre-determined or any intermediate position or for automatically stopping the linear motion assembly at the fully extended or fully retracted position.

h) A spoiler wing system 100, including:

viii. A detached spoiler wing assembly configured to be mounted on the upper rearward portion of a motor vehicle;

ix. At least one electrical motor driven linear-motion device with an extendable shaft configured to be able to move the spoiler wing assembly from a fully retracted position to a fully extended position and back to the retracted position;

x. a vehicle mounting assembly fastened to the linear motion device and configured to be secured to the vehicle body or lid, comprised of one or more components that allow for assembly fixation to the vehicle, linear motion device longitudinal and rotational adjustment and sealing the linear motion device against external environmental conditions, xi. a shaft seal component to separate the motorized linear motion device shaft and all components mounted within the vehicle exterior from environmental conditions present on the exterior portion of the vehicle, xii. a control device for stopping the linear-motion device in a fixed intermediary position during travel up or down or to a selectable position or positions by means of an electrical control system as hard wired or by means of radio frequency transmission between the linear motion device and control device, xiii. an intermediary attachment assembly as a means of connection between the motorized linear-motion device shaft and the spoiler wing assembly, i) The spoiler wing system 100 according to item h), wherein the end of the linear-motion device shaft, or intermediary attachment assembly utilizes a twist lock, cam-lock, threads, mechanical contraction or expansion means or combination of said means, to allow for attachment to the spoiler wing assembly;

j) The spoiler wing system 100 according to item h), wherein the electrical control device can be configured to manually stop the linear motion device at any intermediate position between fully down and fully up positions, or to stop at one or more fixed position(s) between the fully down and fully up position;

k) The spoiler wing system 100 according to item h), wherein a connection between the linear-motion device and control device(s) is provided by a mechanical, electrical, or radio frequency connection or a combination of these.

FIGS. 10A, 10B, 10C, 11, 12B, and 12C are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 10A, 10B, 10C, 11, and 12C depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the spoiler wing control unit 1010 are to be interpreted in the most general manner.

For example, the processor 1102 can include a single physical microprocessor or microcontroller, a cluster of processors, a datacenter or a cluster of datacenters, a computing cloud service, and the like.

In a further example, the non-transitory memory 1104 can include various forms of non-transitory storage media, including random access memory and other forms of dynamic storage, and hard disks, hard disk clusters, cloud storage services, and other forms of long-term storage. Similarly, the input/output 1106 can include a plurality of well-known input/output devices, such as screens, keyboards, pointing devices, motion trackers, communication ports, and so forth.

Furthermore, it shall be understood that the spoiler wing control unit 1010 can include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the spoiler wing control unit 1010 communicates with the spoiler wing extension and retraction system 100 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the spoiler wing extension and retraction system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A spoiler wing extension and retraction system for controlling a spoiler wing on a vehicle, comprising:
   a) a vehicle mounting assembly, which is configured to be connected to a body of the vehicle;
   b) a linear-motion device, comprising:
      a main body, which is connected to the vehicle mounting assembly; and
      an extendable shaft, which is configured to be moveable relative to the main body; and
   c) an intermediate attachment assembly, comprising:
      an intermediate attachment device, which is configured as a threaded single body fitting, comprising:
         a threaded portion, which is positioned in an upper part of the threaded single body fitting; and
         a lower receiving cavity, which is connected to the threaded portion, such that the lower receiving cavity is configured to receive the extendable shaft, such that the extendable shaft is connected to the threaded single body fitting;
   wherein an outer end of the extendable shaft is configured to connect to the spoiler wing of the vehicle, such that the linear-motion device is configured to lift and lower the spoiler wing; and
   wherein an inner end of the intermediate attachment assembly is connected to the outer end of the extendable shaft, such that an outer end of the intermediate attachment assembly is configured to attach to the spoiler wing.

2. The spoiler wing extension and retraction system of claim 1, wherein the vehicle mounting assembly further comprises:
   a) a spider clamp flange, including
      a central flange aperture, which is configured in a longitudinal direction of the spider clamp flange; and
      clamp bolt apertures; and
   b) a circular insert, including:
      a longitudinal gap; and
      a central insert aperture, which is configured to mount around the main body of the linear-motion device;
      wherein the circular insert is configured to be compressible, whereby the longitudinal gap is reduced when the circular insert is compressed;
      such that the circular insert is mounted around the main body of the linear-motion device;
   wherein the spider clamp flange is mounted around the circular insert and tightened in position, such that the vehicle mounting assembly is securely connected to the main body of the linear-motion device;
   such that the circular insert is configured to be radially and vertically adjustable before the circular insert is tightened in position;
   such that the vehicle mounting assembly is configured to be connected to the body of the vehicle, by inserting bolts through the clamp bolt apertures, and securing the bolts to the body of the vehicle;
   such that the extendable shaft protrudes through the central flange aperture.

3. The spoiler wing extension and retraction system of claim 2, wherein the circular insert further includes a plurality of radial notches, which are configured on an inner side of the circular insert, in a longitudinal direction of the circular insert, such that the plurality of radial notches working in conjunction with the longitudinal gap, enable the circular insert to expand around the main body of the linear-motion device.

4. The spoiler wing extension and retraction system of claim 2, wherein the spider clamp flange further comprises opposing flanges, separated by a flange gap, wherein each opposing flange comprises a flange aperture, such that the spider clamp flange is configured to be fastened in position around the circular insert with a clamp nut and a clamp bolt, when the clamp bolt is inserted through the flange apertures.

5. The spoiler wing extension and retraction system of claim 2, wherein the vehicle mounting assembly further comprises:
   a) a seal plate, including:
      seal bolt apertures; and
      a central seal aperture;
   b) a spacer plate, comprising:
      spacer bolt apertures; and
      a central spacer aperture; and
   c) a shaft wiper seal, which is inserted into the central spacer aperture; and
   wherein the spacer plate is configured to be positioned above the spider clamp flange, and the seal plate is configured to be positioned above the spacer plate, such that a lip of the shaft wiper seal is configured to protrude through the central seal aperture;

wherein the seal bolt apertures and the spacer bolt apertures are aligned with the clamp bolt apertures;

such that the extendable shaft protrudes through a central aperture of the shaft wiper seal and through the central seal aperture;

such that the seal plate, spacer plate, and shaft wiper seal form an environmental seal.

6. The spoiler wing extension and retraction system of claim 1, wherein the linear-motion device is an electromechanical linear-motion device, such that the linear-motion device further comprises:
a) an electric motor; and
b) a transmission;
wherein the electric motor is coupled to the extendable shaft via the transmission, in order to enable extension and retraction of the extendable shaft.

7. The spoiler wing extension and retraction system of claim 1, wherein the intermediate attachment assembly further comprises:
a) an intermediate attachment device, comprising:
an upper connecting surface, which is configured to establish a secure contact with an underside of the spoiler wing; and
a lower receiving cavity, which is configured to receive the extendable shaft, such that the extendable shaft is connected to the intermediate attachment device;
wherein the intermediate attachment device is configured with a central aperture going through the upper connecting surface and the lower receiving cavity, in an elongated direction of the intermediate attachment device; and
b) a twist-lock screw;
wherein the twist-lock screw is configured to be inserted through the central aperture, such that a lower head of the twist-lock screw is secured against an inner shelf of the lower receiving cavity, and an upper end of the twist-lock screw is configured to lock into a threaded aperture on the underside of the spoiler wing.

8. The spoiler wing extension and retraction system of claim 7, wherein the intermediate attachment assembly further comprises:
at least one o-ring;
wherein the twist-lock screw is inserted through the at least one o-ring, which is positioned between the lower head of the twist-lock screw and the inner shelf of the lower receiving cavity.

9. The spoiler wing extension and retraction system of claim 7, wherein the intermediate attachment assembly further comprises:
a) a first set screw; and
b) a second set screw;
wherein the linear-motion device, comprises a first threaded receiving cavity aperture, a blind threaded receiving cavity aperture, and a second threaded receiving cavity aperture;
wherein the extendable shaft further comprises a shaft aperture;
wherein the extendable shaft is secured in place with the first set screw passing through the first threaded receiving cavity aperture and the shaft aperture of the extendable shaft, and threaded into the blind threaded receiving cavity aperture, which is oppossedly positioned to the first threaded receiving cavity aperture;
wherein the second set screw is threaded into the second threaded receiving cavity aperture and locked against the extendable shaft to secure the intermediate attachment device to the extendable shaft.

10. The spoiler wing extension and retraction system of claim 1, wherein the intermediate attachment assembly comprises:
an intermediate attachment device, comprising:
a male cam lock fitting, comprising:
a threaded portion, which is positioned in an upper part of the male cam lock fitting; and
a connector portion, which is connected to the threaded portion, such that the connector portion is positioned in a lower part of the male cam lock fitting; and
a female cam-lock assembly, comprising:
a cam-lock body, comprising an upper cavity;
cam-locks, which are oppossedly positioned and connected to the cam-lock body, such that the cam-locks are rotatably depressible; and
a lower receiving cavity, which is configured to receive the extendable shaft, such that the extendable shaft is connected to the female cam-lock assembly;
wherein the connector portion of the male cam lock fitting is inserted into the upper cavity of the cam-lock body, such that the male cam lock fitting is securely connected to the female cam-lock assembly when the cam-locks are rotated inwards;
such that the threaded portion of the male cam lock fitting is configured to screw into a threaded aperture on the underside of the spoiler wing.

11. The spoiler wing extension and retraction system of claim 1, wherein the intermediate attachment assembly comprises:
a) a top o-ring;
b) an intermediate attachment device, comprising:
an upper connecting surface, which is configured to establish a secure contact with an underside of the spoiler wing, wherein the upper connecting surface further comprises
a sealing wall, which is peripherally positioned on an upper surface of the upper connecting surface; and
a lower receiving cavity, which is configured to receive the extendable shaft, such that the extendable shaft is connected to the intermediate attachment device;
wherein the intermediate attachment device is configured with a central aperture going through the upper connecting surface and the lower receiving cavity, in an elongated direction of the intermediate attachment device; and
c) a twist-lock screw;
wherein the top o-ring is mounted inside the peripheral sealing wall;
wherein the twist-lock screw is configured to be inserted through the central aperture, such that a lower head of the twist-lock screw is secured against an inner shelf of the lower receiving cavity, and an upper end of the twist-lock screw is configured to lock into a locking aperture on the underside of the spoiler wing.

12. The spoiler wing extension and retraction system of claim 11, wherein the intermediate attachment assembly further comprises:
a spring;
wherein the twist-lock screw is inserted through the spring, which is positioned between the lower head of the twist-lock screw and the inner shelf of the lower receiving cavity.

13. A spoiler wing extension and retraction system for controlling a spoiler wing on a vehicle, comprising:
   a) a vehicle mounting assembly, which is configured to be connected to a body of the vehicle;
   b) a linear-motion device, comprising:
      a main body, which is connected to the vehicle mounting assembly; and
      an extendable shaft, which is configured to be moveable relative to the main body;
   c) an intermediate attachment assembly, comprising:
      an intermediate attachment device, comprising:
         an upper connecting surface, which is configured to establish a secure contact with an underside of the spoiler wing; and
         a lower receiving cavity, which is configured to receive the extendable shaft, such that the extendable shaft is connected to the intermediate attachment device;
         wherein the intermediate attachment device is configured with a central aperture going through the upper connecting surface and the lower receiving cavity, in an elongated direction of the intermediate attachment device; and
   d) a twist-lock screw;
   wherein an outer end of the extendable shaft is configured to connect to the spoiler wing of the vehicle, such that the linear-motion device is configured to lift and lower the spoiler wing;
   wherein an inner end of the intermediate attachment assembly is connected to the outer end of the extendable shaft, such that an outer end of the intermediate attachment assembly is configured to attach to the spoiler wing; and
   wherein the twist-lock screw is configured to be inserted through the central aperture, such that a lower head of the twist-lock screw is secured against an inner shelf of the lower receiving cavity, and an upper end of the twist-lock screw is configured to lock into a threaded aperture on the underside of the spoiler wing.

14. The spoiler wing extension and retraction system of claim 13, wherein the intermediate attachment assembly further comprises:
   at least one o-ring;
   wherein the twist-lock screw is inserted through the at least one o-ring, which is positioned between the lower head of the twist-lock screw and the inner shelf of the lower receiving cavity.

15. The spoiler wing extension and retraction system of claim 13, wherein the intermediate attachment assembly further comprises:
   a) a first set screw; and
   b) a second set screw;
   wherein the linear-motion device, comprises a first threaded receiving cavity aperture, a blind threaded receiving cavity aperture, and a second threaded receiving cavity aperture;
   wherein the extendable shaft further comprises a shaft aperture;
   wherein the extendable shaft is secured in place with the first set screw passing through the first threaded receiving cavity aperture and the shaft aperture of the extendable shaft, and threaded into the blind threaded receiving cavity aperture, which is opposedly positioned to the first threaded receiving cavity aperture;
   wherein the second set screw is threaded into the second threaded receiving cavity aperture and locked against the extendable shaft to secure the intermediate attachment device to the extendable shaft.

16. A spoiler wing extension and retraction system for controlling a spoiler wing on a vehicle, comprising:
   a) a vehicle mounting assembly, which is configured to be connected to a body of the vehicle;
   b) a linear-motion device, comprising:
      a main body, which is connected to the vehicle mounting assembly; and
      an extendable shaft, which is configured to be moveable relative to the main body; and
   c) an intermediate attachment assembly, comprising:
      an intermediate attachment device, comprising:
         a male cam lock fitting, comprising:
            a threaded portion, which is positioned in an upper part of the male cam lock fitting; and
            a connector portion, which is connected to the threaded portion, such that the connector portion is positioned in a lower part of the male cam lock fitting; and
         a female cam-lock assembly, comprising:
            a cam-lock body, comprising an upper cavity;
            cam-locks, which are opposedly positioned and connected to the cam-lock body, such that the cam-locks are rotatably depressible; and
            a lower receiving cavity, which is configured to receive the extendable shaft, such that the extendable shaft is connected to the female cam-lock assembly;
         wherein the connector portion of the male cam lock fitting is inserted into the upper cavity of the cam-lock body, such that the male cam lock fitting is securely connected to the female cam-lock assembly when the cam-locks are rotated inwards;
         such that the threaded portion of the male cam lock fitting is configured to screw into a threaded aperture on the underside of the spoiler wing;
   wherein an outer end of the extendable shaft is configured to connect to the spoiler wing of the vehicle, such that the linear-motion device is configured to lift and lower the spoiler wing; and
   wherein an inner end of the intermediate attachment assembly is connected to the outer end of the extendable shaft, such that an outer end of the intermediate attachment assembly is configured to attach to the spoiler wing.

17. A spoiler wing extension and retraction system for controlling a spoiler wing on a vehicle, comprising:
   a) a vehicle mounting assembly, which is configured to be connected to a body of the vehicle;
   b) a linear-motion device, comprising:
      a main body, which is connected to the vehicle mounting assembly; and
      an extendable shaft, which is configured to be moveable relative to the main body; and
   c) an intermediate attachment assembly, comprising:
      a top o-ring;
      an intermediate attachment device, comprising:
         an upper connecting surface, which is configured to establish a secure contact with an underside of the spoiler wing, wherein the upper connecting surface further comprises
            a sealing wall, which is peripherally positioned on an upper surface of the upper connecting surface; and a lower receiving cavity, which is configured to receive the extendable shaft, such that the extendable shaft is connected to the intermediate attachment device;

wherein the intermediate attachment device is configured with a central aperture going through the upper connecting surface and the lower receiving cavity, in an elongated direction of the intermediate attachment device; and a twist-lock screw;

wherein the top o-ring is mounted inside the peripheral sealing wall;

wherein the twist-lock screw is configured to be inserted through the central aperture, such that a lower head of the twist-lock screw is secured against an inner shelf of the lower receiving cavity, and an upper end of the twist-lock screw is configured to lock into a locking aperture on the underside of the spoiler wing;

wherein an outer end of the extendable shaft is configured to connect to the spoiler wing of the vehicle, such that the linear-motion device is configured to lift and lower the spoiler wing; and wherein an inner end of the intermediate attachment assembly is connected to the outer end of the extendable shaft, such that an outer end of the intermediate attachment assembly is configured to attach to the spoiler wing.

18. The spoiler wing extension and retraction system of claim 17, wherein the intermediate attachment assembly further comprises:

a spring;

wherein the twist-lock screw is inserted through the spring, which is positioned between the lower head of the twist-lock screw and the inner shelf of the lower receiving cavity.

19. A spoiler wing extension and retraction system for controlling a spoiler wing on a vehicle, comprising:

a) a vehicle mounting assembly, which is configured to be connected to a body of the vehicle, the vehicle mounting comprising:

a spider clamp flange, including
a central flange aperture, which is configured in a longitudinal direction of the spider clamp flange; and
clamp bolt apertures; and a circular insert, including:
a longitudinal gap; and
a central insert aperture, which is configured to mount around the main body of the linear-motion device;

wherein the circular insert is configured to be compressible, whereby the longitudinal gap is reduced when the circular insert is compressed;

such that the circular insert is mounted around the main body of the linear-motion device;

b) a linear-motion device, comprising:
a main body, which is connected to the vehicle mounting assembly; and
an extendable shaft, which is configured to be moveable relative to the main body; and c) an intermediate attachment assembly;

wherein an outer end of the extendable shaft is configured to connect to the spoiler wing of the vehicle, such that the linear-motion device is configured to lift and lower the spoiler wing;

wherein an inner end of the intermediate attachment assembly is connected to the outer end of the extendable shaft, such that an outer end of the intermediate attachment assembly is configured to attach to the spoiler wing; and wherein the spider clamp flange is mounted around the circular insert and tightened in position, such that the vehicle mounting assembly is securely connected to the main body of the linear-motion device;

such that the circular insert is configured to be radially and vertically adjustable before the circular insert is tightened in position;

such that the vehicle mounting assembly is configured to be connected to the body of the vehicle, by inserting bolts through the clamp bolt apertures, and securing the bolts to the body of the vehicle;

such that the extendable shaft protrudes through the central flange aperture.

20. The spoiler wing extension and retraction system of claim 19, wherein the circular insert further includes a plurality of radial notches, which are configured on an inner side of the circular insert, in a longitudinal direction of the circular insert, such that the plurality of radial notches working in conjunction with the longitudinal gap, enable the circular insert to expand around the main body of the linear-motion device.

21. The spoiler wing extension and retraction system of claim 19, wherein the spider clamp flange further comprises opposing flanges, separated by a flange gap, wherein each opposing flange comprises a flange aperture, such that the spider clamp flange is configured to be fastened in position around the circular insert with a clamp nut and a clamp bolt, when the clamp bolt is inserted through the flange apertures.

22. The spoiler wing extension and retraction system of claim 19, wherein the vehicle mounting assembly further comprises:

a) a seal plate, including:
seal bolt apertures; and
a central seal aperture;

b) a spacer plate, comprising:
spacer bolt apertures; and
a central spacer aperture; and c) a shaft wiper seal, which is inserted into the central spacer aperture; and wherein the spacer plate is configured to be positioned above the spider clamp flange, and the seal plate is configured to be positioned above the spacer plate, such that a lip of the shaft wiper seal is configured to protrude through the central seal aperture;

wherein the seal bolt apertures and the spacer bolt apertures are aligned with the clamp bolt apertures;

such that the extendable shaft protrudes through a central aperture of the shaft wiper seal and through the central seal aperture;

such that the seal plate, spacer plate, and shaft wiper seal form an environmental seal.

* * * * *